(12) United States Patent
Mori et al.

(10) Patent No.: US 6,408,027 B2
(45) Date of Patent: Jun. 18, 2002

(54) APPARATUS AND METHOD FOR CODING MOVING PICTURE

(75) Inventors: Toshiaki Mori; Susumu Ibaraki, both of Osaka; Noboru Katta, Hyogo, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/733,950

(22) Filed: Dec. 12, 2000

(30) Foreign Application Priority Data

Dec. 13, 1999 (JP) .......................................... 11-352998

(51) Int. Cl.$^7$ ................................................ H04N 7/12
(52) U.S. Cl. .................................................. 375/240.05
(58) Field of Search ....................... 375/240.01, 240.02, 375/240.03, 240.24, 240.05, 240.07; 348/409.1, 402.1, 401.1, 404.1, 417.1, 415.1, 424.1; H04N 7/12

(56) References Cited

U.S. PATENT DOCUMENTS

| | | | | |
|---|---|---|---|---|
| 5,416,521 A | * | 5/1995 | Chujoh et al. | 375/240.14 |
| 5,426,463 A | * | 6/1995 | Reininger et al. | 375/240.03 |
| 5,610,659 A | * | 3/1997 | Maturi et al. | 375/240.01 |
| 5,913,031 A | * | 6/1999 | Blanchard | 348/512 |
| 6,043,846 A | * | 3/2000 | Shen et al. | 348/409 |
| 6,181,742 B1 | * | 1/2001 | Rajagopalan et al. | 375/240 |

FOREIGN PATENT DOCUMENTS

| | | |
|---|---|---|
| JP | 8-102953 | 4/1996 |
| JP | 10-4546 | 1/1998 |

OTHER PUBLICATIONS

"Test Model 3", IO–IEC/JTC1/SC29/WG11, Nov. 1992, pp. 135–146.

* cited by examiner

Primary Examiner—Nhon Diep
(74) Attorney, Agent, or Firm—Wenderoth, Lind & Ponack, L.L.P.

(57) ABSTRACT

The present invention provides an apparatus and method for coding moving pictures, which reduces a delay time generated by buffering of a decoding apparatus in compressive coding of the moving pictures. In this invention, the target number of bits of one picture P as a target value of the number of generated bits per one picture is set as well as the upper limit number of bits uCg as an upper limit value of the number of generated bits of the picture is set. Then, when the cumulative number of generated bits Cg generated from the first macroblock to a macroblock which is being coded in the picture exceeds the upper limit number of bits uCg in the middle of the picture which is being coded, the coding of a macroblock is skipped to avoid underflow. When the cumulative number of generated bits Cg does not reach the target number of bits of one picture P after the picture has been coded to the end, the stuffing is performed so that the cumulative number of generated bits of one picture Cg reaches the target number of bits of one picture P.

27 Claims, 14 Drawing Sheets frame 1  frame 2  frame 3  frame 4  frame 5  frame 6

Fig.17
| 1 | 2 | 3 | 4 | 5 |
|---|---|---|---|---|
| 6 | 7 | 8 | 9 | 10 |
| 11 | 12 | 13 | 14 | 15 |
Fig.18 (a)   Prior Art
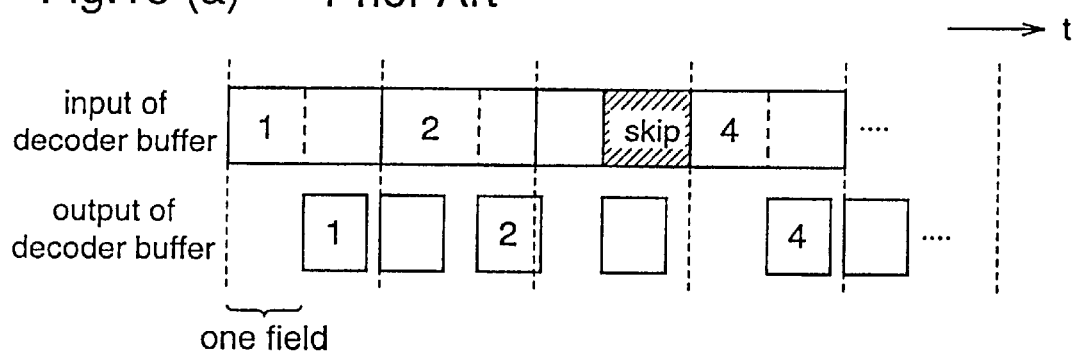
Fig.18 (b)   Prior Art
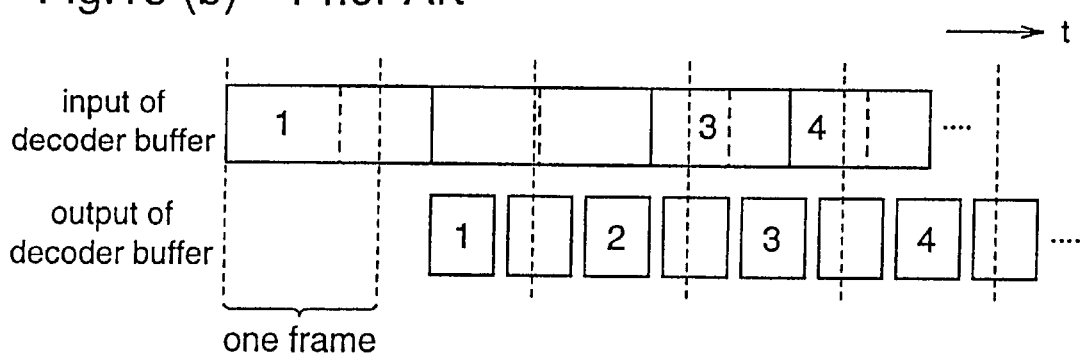

APPARATUS AND METHOD FOR CODING MOVING PICTURE

FIELD OF THE INVENTION

The present invention relates to an apparatus and method for coding moving pictures and, more particularly, to an apparatus and method for compressively coding a video signal so as to reduce the time from when the video signal is input to a coding apparatus until video is output from a decoding apparatus.

BACKGROUND OF THE INVENTION

As a technology for compressively coding a video signal and reducing delay times required for coding and decoding, a low delay coding method according to MPEG2 is described in ISO-IEC/JTC/SC29/WC11 NO328 "Test Model 3".

In this low delay coding method according to MPEG 2, B pictures are not employed and therefore the delay time required for rearrangement of frames is reduced. Further, I picture is inserted only at the head and accordingly the numbers of bits in respective pictures are made equal as much as possible, thereby reducing the delay time of buffering which occurs in an input buffer of the decoding apparatus.

In addition, when an error arises, the technique of intra-slice or intra-column coding is employed to remove noises which arise on a screen. In this technique, the intra-coding is periodically performed by several slices in the frame of P picture or per column having a width of several macroblocks. When one cycle that all areas in the screen are intra-coded is completed, the noises are removed.

In the rate control method, the method which is the same as "Test Model 3", a method other than the low delay is employed. In this method, the target number of bits of one picture is set and the quantization width is calculated on the basis of the difference between the target number of bits, which linearly increases in the picture, and the actual number of generated bits. When the intra-slice coding method is to be employed, the target number of bits of the picture is weighted so as to increase the rate of increase in the target number of bits in the area which is to be intra-slice coded.

However, in this rate control method, the number of generated bits in one picture can exceed the target number of bits in one picture. The numbers of generated bits in respective pictures vary. Accordingly, frame dropping in the video or the increase in the delay time of buffering in the input buffer of the decoder occurs. This is described with reference to FIGS. 18(a) and 18(b).

FIGS. 18(a) and 18(b) are diagrams for explaining states where the frame dropping or increase in the delay time occurs.

In the case where the number of generated bits after coding is increased and the difference between this number and the target number of bits exceeds the tolerance, when the coding of pictures is not skipped as shown in FIG. 18(a), a previously decided delay time is exceeded.

In addition, in order to prevent the frame dropping, it is required to increase the delay time of the buffering in the input buffer of the decoder as shown in FIG. 18(b).

Further, when the variation of the numbers of bits in the respective pictures is to be suppressed in the rate control method, the number of generated bits should be suppressed in a picture whose number of generated bits is increased, by the skip of the coding of macroblocks or by extremely increasing the quantization width. Therefore, the image quality of video after decoding is extremely deteriorated.

SUMMARY OF THE INVENTION

It is an object of the present invention to provide an apparatus and method for coding moving pictures, which reduces the delay time in the decoding apparatus as well as prevents the frame dropping of the video after decoding and stably maintains the image quality.

Other objects and advantages of the present invention will become apparent from the detailed description and specific embodiments described are provided only for illustration since various additions and modifications within the spirit and scope of tho invention will be apparent to those of skill in the art from the detailed description.

A moving picture coding apparatus according to a 1st aspect of the present invention comprises: a coding processing means for coding a video signal in a frame for each block of a prescribed area; and a rate control means for controlling the coding processing means so that a generated code amount after coding of the video signal is fixed for each code amount control unit as a unit of the frame or a unit which is smaller than the frame. Therefore, the delay time of buffering in an input buffer of a decoding apparatus can be reduced.

According to a second aspect of the present invention, in the moving picture coding apparatus of the first aspect, the rate control means comprises.: a generated code amount detection means for detecting a cumulative amount of generated codes as a cumulative value of amounts of codes generated from a first block to a block which is being coded in a code amount control unit which is being coded; and a target code amount calculation means for setting a target generated code amount per code amount control unit as a target value of accumulation of amounts of codes which are generated from a first block to a last block in the code amount control unit, and calculating a target code amount as a target value of accumulation of amounts of codes which are generated from the first block which is being coded in the code amount control unit. The rate control means also comprises: an upper limit code amount calculation means for calculating an upper limit code amount as an upper limit value of accumulation of generated code amounts per code amount control unit; and a quantization scale calculation means for calculating a quantization scale of the block which is being coded, on the basis of the cumulative generated code amount calculated by the generated code amount detection means, the target code amount calculated by the target code amount calculation means, and the upper limit code amount calculated by the upper limit code amount calculation means. Therefore, the image quality of video can be stably maintained without causing video frame dropping after decoding, and the delay time of the buffering in the input buffer of the decoding apparatus can be reduced.

According to a third aspect of the present invention, in the moving picture code apparatus of the second aspect, when the cumulative generated code amount exceeds the upper limit code amount in the code amount control unit which is being coded, the quantization scale calculation means generates an underflow avoidance signal for skipping coding of a block in the code amount control unit by the coding processing means until the cumulative generated code amount becomes equal to or less than the upper limit code amount, thereby avoiding underflow, and when the cumulative generated code amount of the code amount control unit which has been coded does not reach the target generated code amount per the code amount control unit, the quantization scale calculation means subtracts the cumulative generated code amount from the target generated code amount per code amount control unit, thereby calculating a stuffing code amount for a stuffing processing by the coding processing means. Therefore, the number of generated bits in the code amount control unit such as one picture can be fixed.

According to a fourth aspect of the present invention, in the moving picture coding apparatus of the second aspect, the quantization scale calculation means obtains a tolerance generated code amount as a difference between the upper limit code amount and the target code amount as well as obtains a generated code amount error as a difference between the cumulative generated code amount and the target code amount, and calculates the quantization scale using a quantization scale decision function having inclinations which vary with values of the generated code amount error with respect to the tolerance generated code amount. Therefore, the changes in the quantization scale in a frame can be reduced, whereby inconsistencies of the image quality in the frame can be reduced.

According to a fifth aspect of the present invention, in the moving picture coding apparatus of the fourth aspect, the quantization scale decision function has a smaller inclination in the vicinity of 0 of the generated code amount error with respect to the tolerance generated code amount, than in a part where the value of the generated code amount error with respect to the tolerance generated code amount is larger. Therefore, the changes in the quantization scale in a frame can be reduced, whereby the inconsistencies of the image quality in the frame can be reduced.

According to a sixth aspect of the present invention, in the moving picture coding apparatus of the second aspect, the target code amount calculation means obtains distribution of degree of coding difficulty in each code amount control unit when the coding of the code amount control unit has been finished, and calculates the target code amount of a block which is being coded in a subsequent code amount control unit on the basis of the obtained distribution of degree of coding difficulty. Therefore, even when the distribution of the degree of coding difficulty is uneven in a frame, the image quality of video after decoding can be further uniformed in the frame.

According to a seventh aspect of the present invention, in the moving picture coding apparatus of the fourth or sixth aspect, the quantization scale decision function has a reference quantization as a parameter, and the quantization scale calculation means changes the reference quantization scale for each code amount control unit on the basis of the degree of coding difficulty of each code amount control unit. Therefore, the coding can be performed with the quantization scale having a smaller value for video having a lower degree of coding difficulty, whereby the image quality of the video after decoding can be improved.

According to an eighth aspect of the present invention, in the moving picture coding apparatus of the fourth or sixth aspect, the quantization scale decision function has a reference quantization scale as a parameter, and the quantization scale calculation means changes the reference quantization scale for each code amount control unit on the basis of a quantization scale of each of the code amount control units which have been already coded. Therefore, the coding can be performed with the quantization scale having a smaller value for video having a lower degree of coding difficulty, whereby the image quality of the video after decoding can be improved.

According to a ninth aspect of the present invention, in the moving picture coding apparatus of the fourth aspect, the quantization scale decision function is made so that the quantization scale varies according to changes in the value of the generated code amount error with respect to the tolerance generated code amount with possessing hysteresis characteristics. Therefore, even when the degree of coding difficulty in a frame is greatly increased or decreased, the changes in the quantization scale can be suppressed. Accordingly, the larger changes in the image quality after decoding in the frame can be suppressed.

According to a tenth aspect of the present invention, the moving picture coding apparatus of the first aspect comprises: a code amount control unit changing means for changing the code amount control unit according to a delay time required for decoding of coded data by a decoding apparatus which decodes the coded data output by the moving picture coding apparatus. Therefore, the delay time of the buffering in the input buffer of the decoding apparatus can be further reduced.

According to an eleventh aspect of the present invention, in the moving picture coding apparatus of the second aspect, the upper limit code amount calculation means changes the upper limit code amount according to a delay time required for decoding of coded data by a decoding apparatus which decodes the coded data output by the moving picture coding apparatus. Therefore, the image quality of the decoding can be improved.

According to a twelfth aspect of the present invention, the moving picture coding apparatus of any of the first to eleventh aspects comprises: a receiving means for receiving an address of a position of an error which arises in a frame; and an intra area transition means for successively transitioning a position of an area to be intra-coded in each predictive coding frames arranged in the video signal in the order of arrangement of the predictive coding frames in the video signal, and when an error arises in coded data in the video signal, transitioning a position of an area to be intra-coded of a subsequent predictive coding frame to a position of the error in the predictive coding frame on the basis of the address from the receiving means. Therefore, when an error arises in a coded bitstream and noises occur in the video after decoding, the time taken to remove the noises can be reduced.

A moving picture coding method according to a thirteenth aspect of the present invention for coding a video signal for each block of a prescribed area in a frame and controlling an amount of generated codes in a unit for the frame or a unit which is smaller than the frame. The moving picture coding method comprises: detecting a cumulative amount of generated codes as a cumulative value of amounts of codes generated from a first block to a block which is being coded in a code amount control unit which is being coded; calculating a target generated code amount per code amount control unit as a target value of an amount of generated codes per code amount control units; and calculating a target code amount as a target value of accumulation of amounts of codes generated from the first block to the block which is being coded in the code amount control unit on the basis of the target generated code amount per code amount control unit. The motion picture coding method also comprises: calculating an upper limit code amount as an upper limit value of accumulation of amounts generated codes per code amount control unit on the basis of the target generated code amount per code amount control unit; calculating a tolerance generated code amount as a difference; between the upper limit code amount and the target code amount; calculating a generated code amount error as a difference between the cumulative generated code amount and the target code amount; and obtaining a value of the generated code amount error with respect to the tolerance generated code amount, and calculating a quantization scale of a block which is being coded using a quantization scale decision function whose inclination is changed according to the value of the generated code amount error with respect to the tolerance generated code amount. Therefore, the image quality of video can be stably maintained without causing frame dropping of the video after decoding and the delay time of buffering in the input buffer of the decoding apparatus can be reduced.

According to a fourteenth aspect of the present invention, the moving picture coding method of the thirteenth aspect comprises: when the cumulative amount of generated codes exceeds the upper limit code amount in a code amount control unit which is being coded, skipping coding of a block in the coding control unit until the cumulative amount of generated codes becomes equal to or smaller than the upper limit code amount; and when the cumulative amount of generated codes of the coding control unit which has been coded does not reach the target generated code amount per code amount control unit, performing stuffing so that the cumulative amount of generated codes reaches the target generated code amount per code amount control unit. Therefore, the number of generated bits of the coding control unit such as one picture can be fixed.

BRIEF DESCRIPTION OF THE DRAWINGS

FIG. 17 is a diagram showing addresses of areas to be intra-coded in a screen.

FIGS. 18(a) and 18(b) are diagrams for explaining states where frame dropping or increase in the delay time occurs in a prior art.

DETAILED DESCRIPTION OF THE PREFERRED EMBODIMENTS

[Embodiment 1]

Figure 1:
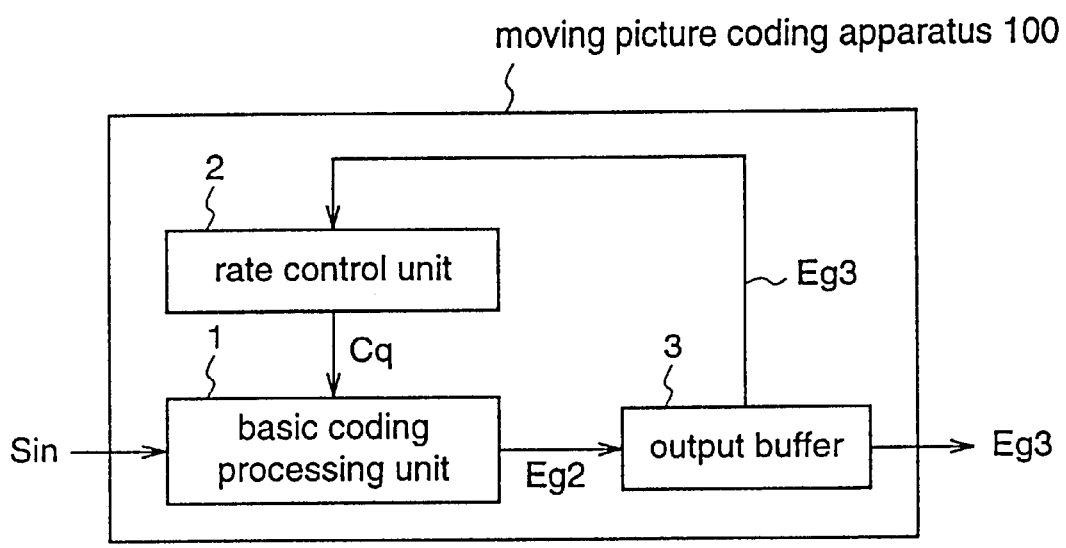
FIG. 1 is a diagram for explaining a moving picture coding apparatus 100 according to a first embodiment of the present invention.

FIG. 1 is a diagram illustrating a structure of a moving picture coding apparatus according to the first embodiment.

In this figure, reference numeral 100 denotes the moving picture coding apparatus.

A basic coding processing unit (coding processing means) 1 compressively encodes an input video signal Sin for each block of a fixed area in a frame, and generates a bitstream Eg2. An output buffer 3 temporarily contains the generated bitstream Eg2, and thereafter outputs a bitstream Eg3 at a previously decided output bit rate. A rate control unit (rate control means) 2 generates a rate control signal Cq on the basis of the output Eg3 from the output buffer 3 so that the number of generated bits from the basic coding processing unit 1 is equal to the number of bits which is previously decided for each fixed code amount control unit such as one picture, i.e., the target amount of generated codes per code amount control unit, and controls the basic coding processing unit 1.

Figure 2:
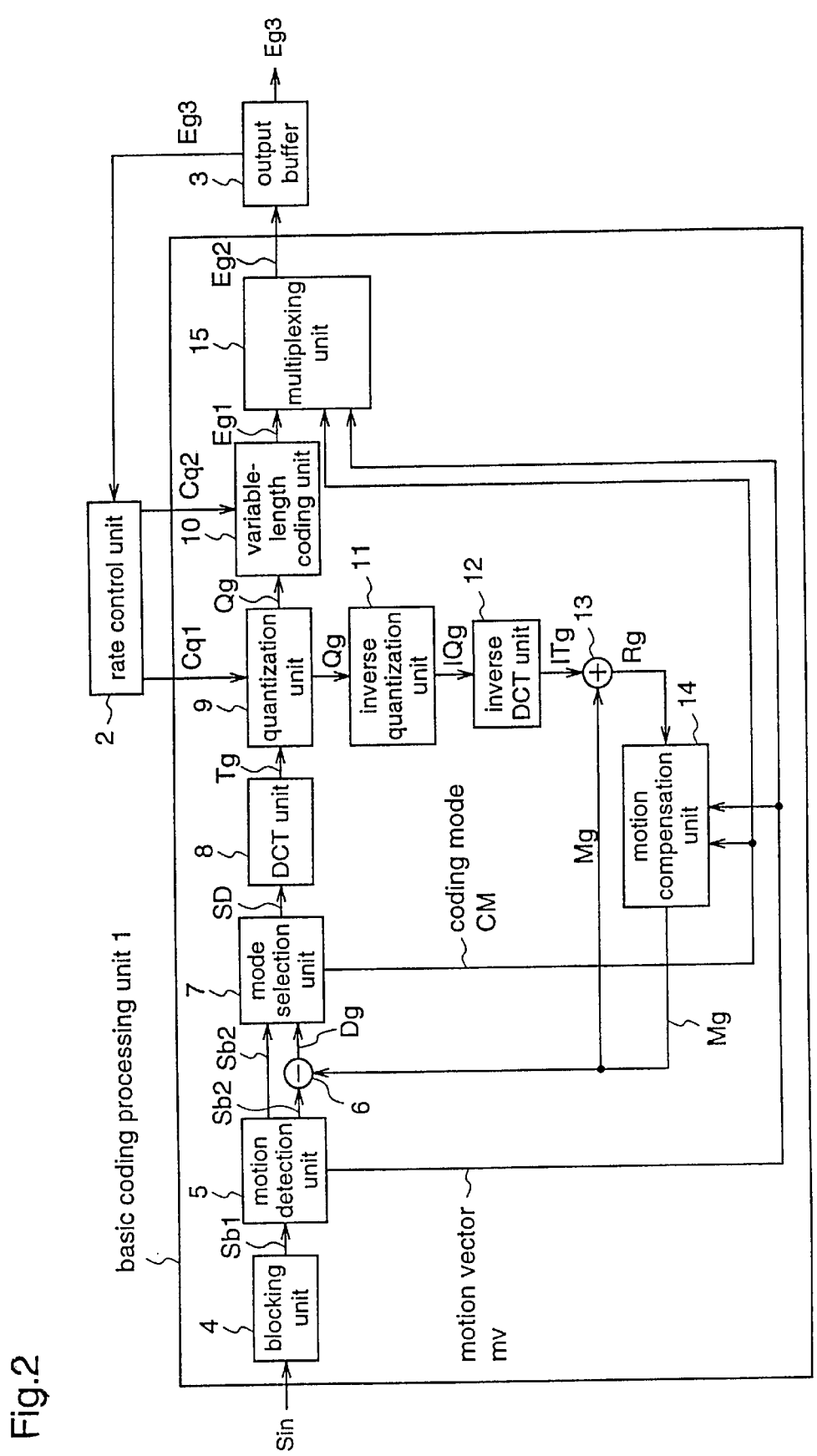
FIG. 2 is a diagram for explaining a detailed structure of the moving picture coding apparatus 100 according to the first embodiment.

FIG. 2 is a block diagram illustrating a structure of the basic coding processing unit 1.

In this figure, a blocking unit 4 divides the input non-compressed video signal Sin into plural pieces of original image macroblock data Sb1, each having the same size, for each frame. A motion detection unit 5 outputs the original image macroblock data Sb1 from the blocking unit 4 as original image macroblock data Sb2 as well as obtains a motion vector mv of the original image macroblock data Sb1. A subtraction unit 6 calculates a pixel difference Dg between the output Sb2 of the motion detection unit 5 and a reference macroblock data Mg. A mode selection unit 7 selects a coding mode of a macroblock to be coded from the intra-coding mode and differential coding mode. The mode selection unit 7 comprises an intra area transition means for successively making a transition of the position of the area to be intra-coded in respective predictive coded Frames arranged in the video signal Sin, in the order in which the predictive coded frames are arranged in the video signal, and specifying the area to be intra-coded, and a mode selection means for selecting the coding mode of a macroblock to be coded according to the area to be intra-coded, specified by the intra area transition means, and outputting one of the original image macroblock data Sb2 from the motion detection unit 5 and the differential macroblock data Dg from the subtraction unit 6 in accordance with the selected coding mode, as well as outputting the selected coding mode CM. A DCT unit 8 subjects the output SD from the mode selection unit 7 to a DCT (Discrete Cosine Transformation) processing for transforming the spatial area data into the frequency area data for the output SD of the mode selection unit 7. A quantization unit 9 subjects the output Tg of the DCT unit 8 to a quantization processing in accordance with a rate control signal Cq1. A variable-length coding unit 10 subjects the output Qg of the quantization unit 9 to a variable-length coding processing in accordance with a rate control signal Cq2. A multiplexing unit 15 multiplexes the output Eg1 of the variable-length coding unit 10, the output mv of the motion detection unit 5, and the output CM of the mode selection unit 7.

An inverse quantization unit 11 subjects the output Qg of the quantization unit 9 to an inverse quantization. An inverse DCT unit 12 subjects the output IQg of the inverse quantization unit 11 to an inverse DCT (Inverse Discrete Cosine Transformation) processing. An addition unit 13 adds the output data Itg from the inverse DCT unit 12 and the reference macroblock data Mg and generates regenerated data Rg. A motion compensation unit 14 extracts the reference macroblock data Mg from the output data Rg of the addition unit 13 on the basis of the motion vector mv from the motion detection unit 5. The motion compensation unit 14 outputs the reference macroblock data Mg to the subtraction unit 6 as well as, when the coding mode of the macroblock from the inverse DCT unit 12 is the differential coding mode on the basis of the coding mode CM from the mode selection unit 7, outputs the reference macroblock data Mg to the addition unit 13.

The rate control signal Cq1 and the rate control signal Cq2 are output by the rate control unit 2. The rate control signal Cq1 includes a quantization scale q_scale for the quantization of a macroblock and an underflow avoidance signal uf for avoiding the underflow of the excess number of bits when the number of generated bits per code amount control unit exceeds the number of bits which can be processed within the code amount control unit. The rate control signal Cq2 includes the data amount sbt of stuffing bits which are used when the number of generated bits per code amount control unit does not reach the target amount of generated codes per code amount control unit, to insert data of the lacking number of bits in a bitstream to stuff the data.

Figure 4:
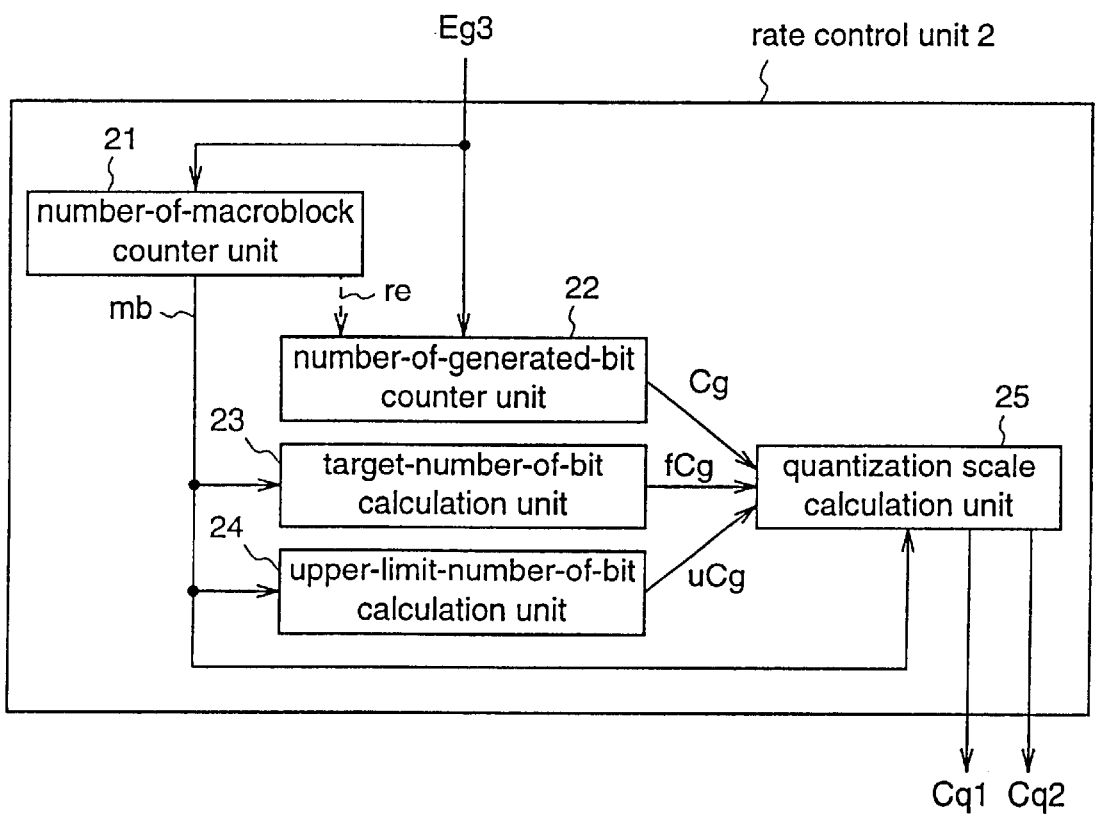
FIG. 4 is a diagram for explaining a rate control unit 2 of the first embodiment.

FIG. 4 is a block diagram illustrating a structure of the rate control unit 2.

In this figure, a counter unit (hereinafter also referred to as number-of-macroblock counter unit) 21 counts the number mb of already coded macroblocks in a picture which is being coded on the basis of the bitstream Eg3 from the output buffer 3 as well as generates a reset signal re when the last coded macroblock in the code amount control unit has been counted. A counter unit (hereinafter, also referred to as number-of-generated-bit counter unit) 22 (generated code amount detection means) counts the cumulative number of generated bits (cumulative amount of generated codes) Cg as a cumulative value of the numbers of bits generated in from the first macroblock in the code amount control unit to a macroblock which is being coded in the code amount control unit on the basis of the bitstream Eg3 from the output buffer 3 and the reset signal re from the counter unit 21. A calculation unit (hereinafter also referred to as target-number-of-bit calculation unit) 23 (target code amount calculation means) sets the target number of bits of one code amount control unit as the target value of the accumulation of the numbers of bits generated in from the first macroblock to the last macroblock in the code amount control unit (target amount of generated codes per code amount control unit P), and calculates the target number of bits (target code amount) fCg as a target value of the accumulation of the numbers of bits generated in from the first macroblock in the code amount control unit to the macroblock which is being coded in the code amount control unit on the basis of the number of macroblocks mb counted by the counter unit 21. A calculation unit (hereinafter also referred to as upper-limit-number-of-bit calculation unit) 24 calculates the upper limit number of bits (upper limit code amount) uCg as the upper limit value of the accumulation of the numbers of bits generated per one code amount control unit on the basis of the number mb of macroblocks counted by the counter unit 21. A quantization scale calculation unit 25 (quantization scale calculation means) calculates a quantization scale q_scale of the macroblock which is being coded on the basis of the cumulative number of generated bits Cg counted by the counter unit 22, the number of macroblocks mb counted by the counter unit 21, the target number of bits fCg calculated by the calculation unit 23, and the upper limit number of bits uCg calculated by the calculation unit 24.

Assume that the moving picture coding apparatus 100 according to the first embodiment takes one picture as the code amount control unit. Hereinafter, the operation of the moving picture coding apparatus 100 will be described.

Initially, the video signal Sin is input to the moving picture coding apparatus 100.

In the basic coding processing unit 1, the video signal Sin is subjected to the compressive coding process on the basis of the rate control signal Cq from the rate control unit 2. In the basic coding processing unit 1, the order of the frames is not changed and therefore the respective frames are coded in the order of the frames arranged in the input video signal Sin. When the video signal Sin is input in the field structure, each field is coded as a picture. Then, only the head picture in the video signal Sin is coded as an intra picture (I picture) which is an intra-frame coded picture. Pictures subsequent to I picture are all coded as differential pictures (P pictures) as predictive coded pictures.

The bitstream Eg2 which is obtained by the compressive coding process in the basic coding processing unit 1 is output to the output buffer 3. The bitstream Eg2 is temporarily stored in the output buffer 3 and thereafter output as the coded data Eg3 at a previously decided output bit rate. In the rate control unit 2, the rate control signal Cq is generated on the basis of the output Eg3 of the output buffer 3, and output to the basic coding processing unit 1.

Next, the operation of the basic coding processing unit 1 is described.

Initially, the non-compressed video signal Sin is input of the basic coding processing unit 1.

In the blocking unit 4, the input video signal Sin is divided into plural pieces of original image macroblock data Sb1 frame by frame. Then, the divided plural pieces of the original image macroblock data Sb1 are output to the motion detection unit 5 one by one.

The motion detection unit 5 outputs the output Sb1 from the blocking unit 4 as the original image macroblock data Sb2 to the mode selection unit 7 and the subtraction unit 6, as well as obtains the motion vector mv on the basis of the output Sb1 from the blocking unit 4. The obtained motion vector mv is output to the motion compensation unit 14 and the multiplexing unit 15.

In the subtraction unit 6, the difference in pixels between the original image macroblock data Sb2 from the motion detection unit 5 and the reference macroblock data Mg is obtained, and the difference is output to the mode selection unit 7 as the differential macroblock data Dg.

In the intra area transition means of the mode selection unit 7, the transition of the position of area to be intra-coded in the respective P pictures arranged in the video signal Sin is successively made in the order of the arrangement of the respective P pictures in the video signal Sin. Then, the area to be intra-coded is specified on the basis of the transitioned position. In the mode selection means of the mode selection unit 7, the coding mode for a macroblock to be coded is selected on the basis of the area to be intra-coded, specified by the intra area transition means. At this time, as the coding mode for a macroblock in the area to be intra-coded, the intra-coding mode is selected. In addition, as the coding mode for a macroblock which is not included in the area to be intra-coded, one of the intra-coding mode and the differential coding mode, having a smaller number of predictive generated bits, is selected.

Then, when the intra-coding mode is selected by the mode selection means of the mode selection unit 7, the original image macroblock data Sb2 from the motion detection unit 5 is output to the DCT unit 8. When the differential coding mode is selected, the differential macroblock data Dg from the subtraction unit 6 is output to the DCT unit 8. The decided coding mode CM for the macroblock is output to the motion compensation unit 14 and the multiplexing unit 15.

In the DCT unit 8, the macroblock data SD from the mode selection unit 7 is transformed into DCT coefficients (frequency components) Tg in the DCT (Discrete Cosine Transformation) processing, and the DCT coefficients Tg are output to the quantization unit 9.

In the quantization unit 9, the DCT coefficients Tg from the DCT unit 8 are subjected to the quantization processing in accordance with the rate control signal Cq1 from the rate control unit 2. The quantized value Qg obtained by this quantization processing is output to the variable-length coding unit 10 and the inverse quantization unit 11.

In the variable-length coding unit 10, the variable-length coding processing is performed to convert the quantized value Qg from the quantization unit 9 into variable-length coded data Eg1 in accordance with the rate control signal Cq2 from the rate control unit 2. The variable-length coded data Eg1 is output to the multiplexing unit 15.

In the multiplexing unit 15, the variable-length coded data Eg1, the motion vector mv from the motion detection unit 5, and the coding mode CM from the mode selection unit 7 are multiplexed and output as a bitstream Eg2.

On the other hand, in the inverse quantization unit 11, the inverse quantization processing is performed to the quantized value Qg from the quantization unit 9. The DCT coefficients IQg obtained by this inverse quantization processing are output to the inverse DCT unit 12. The DCT coefficients IQg are transformed by the inverse DCT (Inverse Discrete Cosine Transformation) processing in the inverse DCT unit 12 into spatial area data ITg, and the data ITg is output to the addition unit 13.

In the addition unit 13, when the coding mode for the spatial area data ITg from the inverse DCT unit 12 is the intra-coding mode, the output data ITg from the inverse DCT unit 12 is output to the motion compensation unit 14 as it is as regenerated data Rg. When the coding mode is the differential coding mode, the output data ITg from the inverse DCT unit 12 is added to the reference macroblock data Mg which is input from the motion compensation unit 14, whereby the regenerated data Rg is generated. The generated regenerated data Rg is output to the motion compensation unit 14. In the motion compensation unit 14, the reference macroblock data Mg is extracted from the regenerated data Rg from the addition unit 13 on the basis of the motion vector mv from the motion detection unit 5. The extracted reference macroblock data Mg is input to the subtraction unit 6, as well as input to the addition unit 13 when the coding mode is the differential coding mode on the basis of the coding mode CM from the mode selection unit 7.

Then, the description is given of the position of an area to be intra-coded in the P picture, which is specified by the intra area transition means of the mode selection unit 7.

Figure 3:
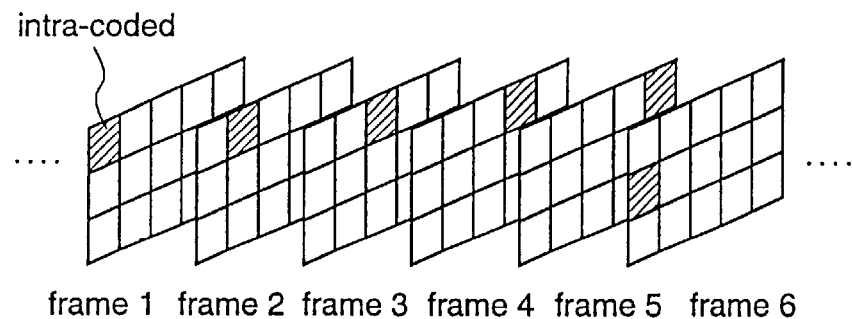
FIG. 3 is a diagram for explaining how the position of an area to be intra-coded is transitioned in a screen.

FIG. 3 is a diagram showing an example where the position of the area to be intra-coded in P picture is successively transitioned in a screen, in the order of the arrangement in P picture.

The intra area transition means divides a screen of one frame composed of 720×480 pixels into 15 areas, each being composed of 144×160 pixels. Then, it successively transitions the position of the area to be intra-coded in each of frames in the order of arrangement of the frames so that the positions of the areas to be intra-coded in the screen make a circuit in the screen in a cycle of 15 frames.

Accordingly, without I picture having an increased number of generated bits being inserted, even in the case where an error arises in a bitstream and the video after decoding includes noises, the noises are removed with the continuance of the decoding.

Then, the operation of the rate control unit 2 is described.

Initially, the bitstream Eg3 from the output buffer 3 is input to the counter unit 21 and the counter unit 22.

In the counter unit 22, the cumulative number of generated bits Cg, i.e., the accumulation of the numbers of bits generated in from the first macroblock to a macroblock which is being coded in the picture is counted in the bitstream Eg3 from the output buffer 3. The counted cumulative number of generated bits Cg is output to the quantization scale calculation unit 25.

In the counter unit 21, the number mb of already coded macroblocks in the picture is counted in the bitstream Eg3 from the output buffer 3. The counted number mb of macroblocks is output to the calculation unit 23, the calculation unit 24 and the calculation unit 25. Further, in the counter unit 21, when the counting of the number of macroblocks of one picture is finished, the reset signal re is output to the counter unit 22. Then, the count of the cumulative number of generated bits Cg in the counter unit 22 is reset to 0.

In the calculation unit 23, the target number of bits fCg is calculated on the basis of the following expression (1). The calculated target number of bits fCg is output to the quantization scale calculation unit 25.

The target number of bits fCg=the target number of bits of one picture P×αxthe number of already coded macroblocks mb/the number of macroblocks of one picture (1)

Here, the target number of the bits of one picture p is obtained by dividing the output bit rate R by a picture rate and α is a real number which satisfies 0<α≦1. That is, the target number of bits of one picture P is uniformly set for all pictures. Then, the target number of bits fCg of a macroblock which is being coded is calculated so as to be increased by a fixed code amount linearly from 0 bit to the target number of bits of one picture P for the number of already coded macroblocks mb in the picture, so that each cumulative number of generated bits Cg per picture approaches the target number of bits of one picture P.

In addition, in the calculation unit 24, the upper limit number of bits uCg is calculated on the basis of the following expression (2). The calculated upper limit number of bits uCg is output to the quantization scale calculation unit 25.

$$\text{The upper limit number of bits uCg=the target number of bits of one picture } P-\beta \qquad (2)$$

Here, β is an integer which satisfies 0≦β< the target number of bits of one picture P×(1−α)

In the quantization scale calculation unit 25, a reference quantization scale q_st is obtained on the basis of the output bit rate which is previously decided in the moving picture coding apparatus 100. The quantization scale q_scale is obtained on the basis of the reference quantization scale q_st, the cumulative number of generated bits Cg from the counter unit 22, the target number of bits fCg from the calculation unit 23, the upper limit number of bits uCg from the calculation unit 24, and the number of macroblocks mb from the counter unit 21. The obtained quantization scale q_scale is output to the quantization unit 9 as the rate control signal Cq1. In addition, in the quantization scale calculation unit 25, when the cumulative number of generate bits Cg exceeds the upper limit number of bits uCg in the middle of coding of the picture, the underflow avoidance signal uf for skipping the coding of a macroblock to avoid the underflow of the excess number of bits is output to the quantization unit 9 as the rate control signal Cq1. Further, in the quantization scale calculation unit 25, in the case where the cumulative number of generated bits Cg in one picture does not reach the target number of bits of one picture P when the coding of the last macroblock in the picture is finished, the number sbt of bits for performing the stuffing so that the cumulative number of generated bits Cg in one picture reaches the target number of bits of one picture P is output to the variable-length coding unit 10 as the rate control signal Cq2.

As described above, the rate control unit 2 sets the target number of bits of one picture P as well as sets the upper limit number of bits uCg as the upper limit value of the accumulation of the numbers of bits generated in one picture. Then, it controls the number of generated bits after coding of the input video signal Sin to have a fixed amount which is equal to the target number of bits per picture P, picture by picture, so that the cumulative number of generated bits Cg does not exceed the upper limit number of bits uCg in the middle of the coding of one picture and by performing the stuffing when the cumulative number of generated bits per picture Cg is less than the target number of bits per picture P.

Figure 8:
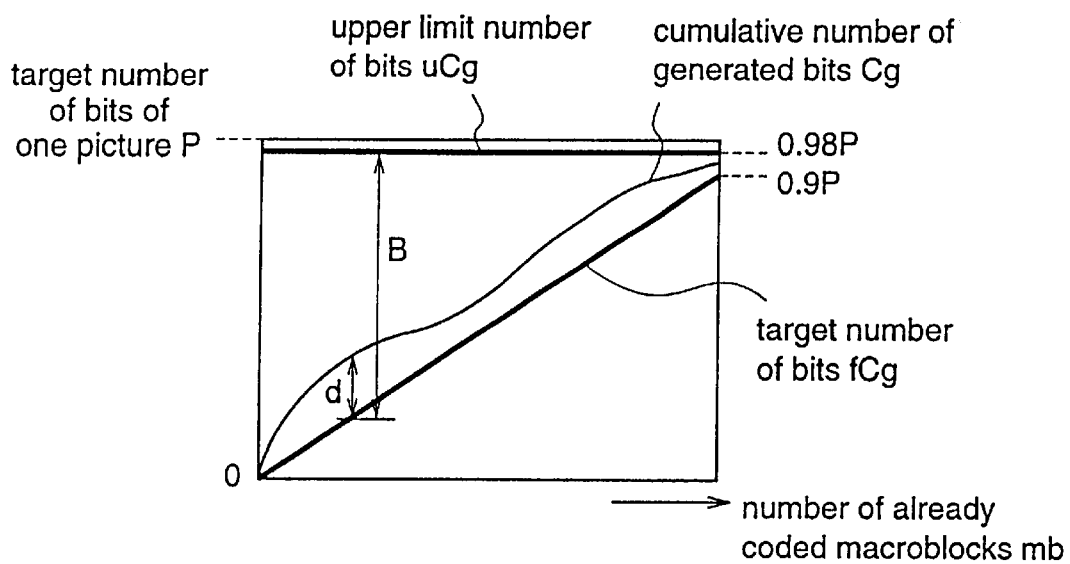
FIG. 8 is a graph showing changes in a target number of bits fCg and an upper limit number of bits uCg, with the progress of the coding in one picture.

FIG. 8 is a graph showing the target number of bits fCg and the upper limit number of bits uCg of each macroblock, which vary with the progress of coding in one picture.

The cumulative number of generated bits Cg shown by the graph in this figure is an example. The abscissa of the graph represents the number of already coded macroblocks and the ordinate represents the number of bits. Reference d in the figure denotes the cumulative number of generated bits Cg—the target number of bits fCg. B denotes the upper limit number of bits uCg—the target number of bits fCg. In this figure, the parameters for deciding the target number of bits fCg and the upper limit number of bits uCg are set as follows: α=0.9, β=the target number of bits of one picture P×0.02

As can be seen from the graph, the difference between the target number of bits fCg and the upper limit number of bits uCg is larger on the left of the graph, i.e., in the upper part of the picture. Therefore, even when the cumulative number of generated bits Cg is larger, the quantization scale does not increase abruptly, whereby the change in the image can be suppressed. In addition, the target number of bits fCg at the end of the picture is set at 90% of the target number of bits of one picture P. Therefore, the cumulative number of generated bits Cg is suppressed entirely. Accordingly, even when the cumulative number of generated bits Cg increases in the lower part of the picture, the lack of bits to be allocated hardly occurs, whereby breaking of the screen due to the lack of bits to be allocated hardly occurs.

Next, the operation of the quantization scale calculation unit 25 is described with reference to the flowchart of FIG. 5.

Initially, in step 101, the reference quantization scale q_st is decided from the previously decided output bit rate R of the moving picture coding apparatus 100, and the value of the quantization scale q_scale to be output is assumed to be q_st.

Here, the value of the reference quantization scale q_st is set, for example, at 9 when the output bit rate R is smaller than 4 Mbps, 8 when 4 Mbps≦R<6 Mbps, 7 when 6 Mbps≦R<9 Mbps, and 6 when 9 Mbps≦R.

The value of the reference quantization scale q_st is decided according to the output bit rate R, while this value can be changed as needed.

Then, in step 102, it is decided on the basis of the output of the counter unit 21 whether it is the sequence end of the video signal or not. When it is not the sequence end, the analysis is finished. When it is not the sequence end, the operation proceeds to step 103. In step 103, the quantization scale q_scale is output and the operation proceeds to step 104.

In step 104, the cumulative number of generated bits Cg from the counter unit 22, the target number of bits fCg from the calculation unit 23, the upper limit number of bits uCg from the calculation unit 24, and the number of macroblocks mb from the counter unit 21 are read, and the operation proceeds to step 105.

In step 105, the error in the number of generated bits as the difference between the cumulative number of generated bits Cg and the target number of bits fCg is obtained, and the tolerance of the number of generated bits as the difference between the upper limit number of bits uCg and the target number of bits fCg is obtained. Then, the error in the number of generated bits from the tolerance of the number of generated bits is normalized on the basis of the following expression (3) to obtain a normalized error D in the number of generated bits, and then the operation proceeds to step 106.

$$\text{The normalized error D in the number of generated bits =(the cumulative number of generated bits Cg—the target number of bits fCg)}\times 1335008/\text{(the upper limit value of bits uCg—the target number of bits fCg)} \qquad (3)$$

Here, the value 1335008 is obtained by subtracting a constant 500000 from a value 1835008 showing the buffer size of the MPEG decoder.

In step 106, the cumulative number of generated bits Cg is compared with the upper limit number of bits uCg. When the cumulative number of generated bits Cg exceeds the upper limit number of bits uCg, the operation proceeds to step 107 and then the underflow avoidance signal uf is output.

When the cumulative number of generated bits Cg does not exceed the upper limit number of bits uCg, the operation proceeds to step 108. In step 108, it is examined from the number of already coded macroblocks mb whether the coding of the picture has been finished. When the coding has been finished, the operation proceeds to step 109. Then, the value which is obtained by subtracting the cumulative number of generated bits in the picture Cg from the target number of bits of one picture P is output to the variable-length coding unit 10 as the number sbt of stuffing bits for the stuffing processing. The number sbt of stuffing bits is input to the variable-length coding unit 10. The stuffing bits of the number sbt are input behind the last macroblock of the picture by the stuffing processing in the variable-length coding unit 10 and thereafter the operation proceeds to step 110. In step 110, the value of the quantization scale $q_{13}$ scale is set to be q_st and then the operation returns to step 102.

When it is decided in step 108 that the coding of the picture has not been finished, the operation proceeds to step 111. In step 111, the quantization scale is obtained on the basis of the quantization scale decision function f(x) as shown by following expressions (4)–(8) from the normalized error D in the number of generated bits, which is obtained in step 105, and then the operation returns to step 102.

When $x < -400{,}000$, $f(x)=1$ (4)

When $-400{,}000 < x \leq 0$, $f(x)=q\_st \times R/(R-37.5x)$ (5)

When $0 < x \leq 600{,}000$, $f(x)=q\_st \times R/(R-1.67x)$ (6)

When $600{,}000 < x \leq 1{,}200{,}000$, $f(x)=q\_st \times R/(R-4.0x)-3.0$ (7)

When $1{,}200{,}000 < x$, $f(x)=31$ (8)

Here, x is the value of the normalized error in the number of generated bits. R is the value of the output bit rate of the moving picture coding apparatus 100.

Figure 6:
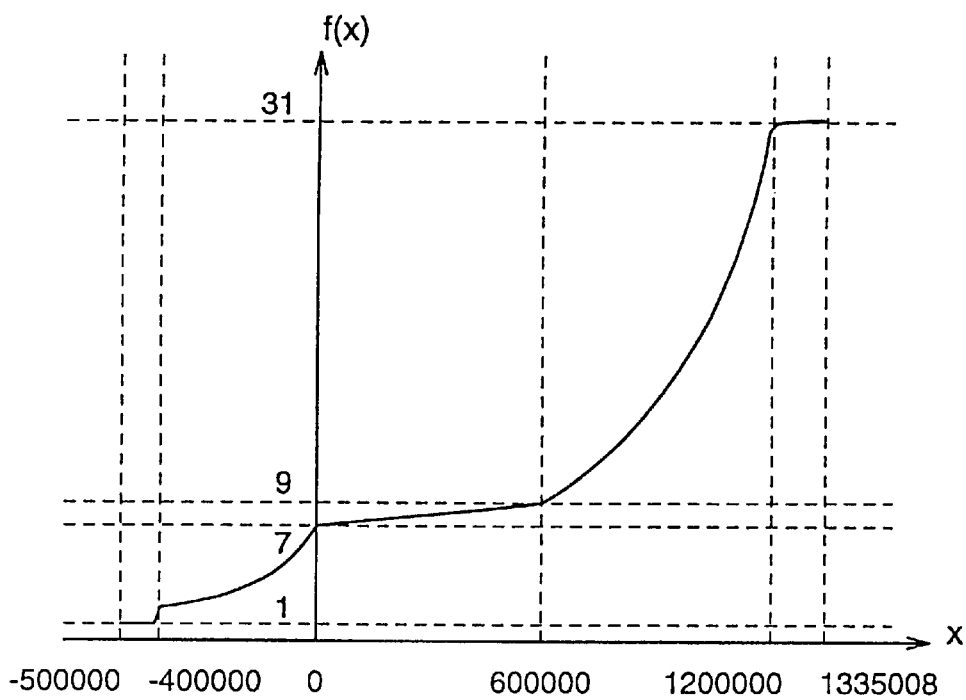
FIG. 6 is a graph showing characteristics of a quantization scale decision function to be used in the quantization scale calculation unit 25 of the first embodiment in a case where q_st is 7 and R is 6,000,000.

FIG. 6 is a graph showing the characteristics of the quantization scale decision function in the case where the reference quantization scale q_st=7 and R=6,000,000. The abscissa represents the normalized error in the number of generated bits and the ordinate represents the quantization scale. The quantization scale decision function f(x) is a graph of a curve having five kinds of inclination according to the values of the normalized error x in the number of generated bits (see expressions (4) to (8)). Particularly, when the normalized error x in the number of generated bits is in the vicinity of 0, i.e., the cumulative number of generated bits Cg is approximately the target number of bits fCg, the inclination of the graph is set to be smaller as compared to a part in which the normalized error x in the number of generated bits is larger, so that the quantization scale is not largely changed with the increase or decrease in the error of the cumulative number of generated bits Cg.

As can be seen from the full line in the graph, when the error between the cumulative number of generated bits Cg and the target number of bits fCg is 0, the quantization scale is the reference quantization scale. As the cumulative number of generated bits Cg becomes larger than the target number of bits fCg, the quantization scale is increased. On the other hand, as the cumulative number of generated bits Cg becomes smaller than the target number of bits fCg, the quantization scale is decreased. That is, when the difference between the cumulative number of generated bits Cg and the target number of bits fCg is approximately 0, the quantization scale does not largely vary with the increase or decrease of the error in the cumulative number of generated bits Cg, whereby the abrupt change in the image quality is suppressed.

Figure 7:
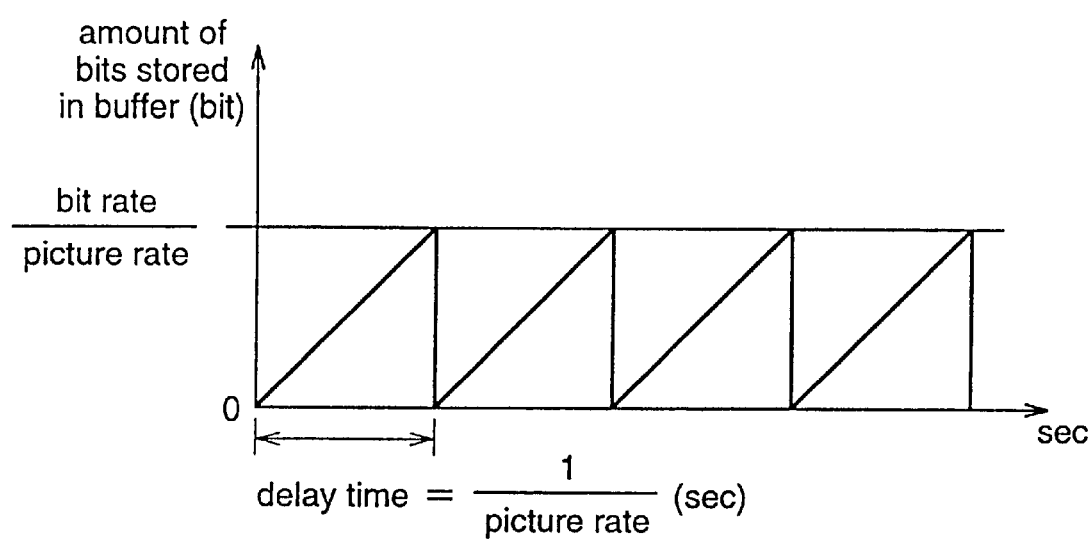
FIG. 7 is a diagram showing the amount of data stored in an input buffer of a decoding apparatus for decoding coded data which have been generated by the moving picture coding apparatus of the present invention.

FIG. 7 is a diagram showing the change in the amount of bits stored in the input buffer of the decoding apparatus for decoding the bitstream Eg3 which is generated using the moving picture coding apparatus 100 according to the first embodiment.

When the bitstream Eg3 which is generated by coding the video signal of 60 fields per second using the moving picture coding apparatus 100 of the first embodiment with coding one field as one picture is the input data to the decoding apparatus, the decoding apparatus can perform the decoding with the delay time of one-sixtieth second without overflow or underflow of the buffer.

That is, in the moving picture coding apparatus 100 according to the first embodiment, the number of generated bits per picture can be the prescribed number of bits which is decided from the bit rate and the picture rate. Therefore, the decoding apparatus for decoding the bitstream Eg3 which is generated using the moving picture coding apparatus 100 of the first embodiment can decode each picture with the delay time taken to store one picture in the input buffer.

As described above, according to the moving picture coding apparatus of the first embodiment, the target amount of generated codes per code amount control unit (target number of bits of one picture P) is decided as well as the upper limit code amount as the upper limit value of the accumulation of the numbers of bits generated in the code amount control unit (upper limit number of bits uCg) is decided. Then, the input video signal is coded with controlling the number of generated bits for each code amount control unit to be the prescribed amount which is equal to the target amount of generated codes per code amount control unit so that the accumulation of the numbers of bits generated in the code amount control unit does not exceed the upper limit number of bits. Therefore, the amount of generated bits in units of one picture or in smaller units such as several slices can be fixed. Accordingly, the image quality of the video can be stably maintained without causing the frame dropping of the video after decoding, as well as the delay of the decoding process for the coded data which are generated by the moving picture coding apparatus in the decoding apparatus can be reduced.

Further, according to the moving picture coding apparatus of the first embodiment, the quantization scale is calculated using the quantization scale decision function in which the inclination varies with the values of the normalized error in the number of generated bits, more particular, the inclination is smaller in the vicinity of a part where the normalized error in the number of generated bits is 0 than in the part where the normalized error of the number of generated bits is larger. Therefore, the quantization scale does not greatly vary with the increase or decrease in the error of the cumulative number of generated bits Cg when the normalized error of the number of generated bits is in the vicinity of 0, i.e., the cumulative number of generated bits Cg is approximately the target number of bits fCg. Accordingly, the abrupt change in the image quality can be suppressed.

Figure 9:
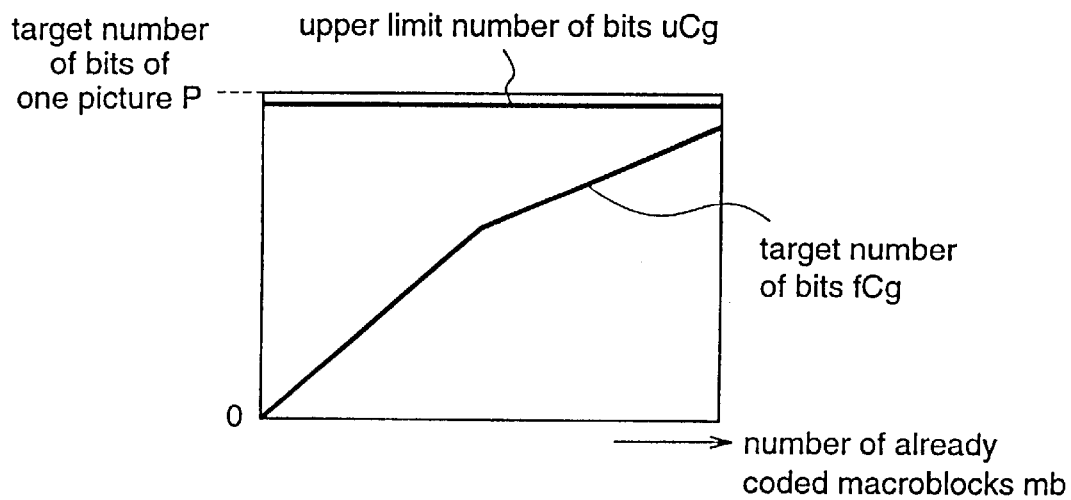
FIG. 9 is a graph showing changes in the target number of bits fCg and the upper limit number of bits uCg with the progress of the coding in one picture, in a case where the inclination of the increase in the target number of bits fCg is changed in the middle of the picture.

In this first embodiment, the target number of bits fCg is linearly increased with the increase in the number mb of already coded macroblocks by the fixed code amount from the macroblock at the head of the picture to the macroblock at the picture end, i.e., 0 to Pxα. However, the target number of bits fCg at the head of the picture can be larger or smaller than 0. Or, as shown in FIG. 9, the inclination of the increase in the target number of bits fCg can be changed in the middle of the picture. In this case, even when the complexity is not uneven in a screen, the image quality in the screen can be uniformed. Here, the magnitude of the inclination can be either from a smaller one to a large one or from a larger one to a smaller one. In addition, the inclination can be changed at two or more positions.

The value of the upper limit number of bits uCg is always constant in this first embodiment. However, like the above-mentioned target number of bits fCg, the inclination can be varied with the increase in the number of already coded macroblocks. In addition, the spacing between the upper limit number of bits uCg and the target number of bits fCg can not only be narrowed with the increase in the number of already coded macroblocks but also be always a constant.

Furthermore, the upper limit number of bits uCg can be decided so as to exceed the target number of bits of one picture P. In this case, when the cumulative number of generated bits in one picture uCg exceeds the target number of bits of one picture P, a value which is obtained by subtracting the target number of bits of one picture P from the cumulative number of generated bits in one picture is used as the initial value of the cumulative number of generated bits Cg of the next picture.

Figure 10:
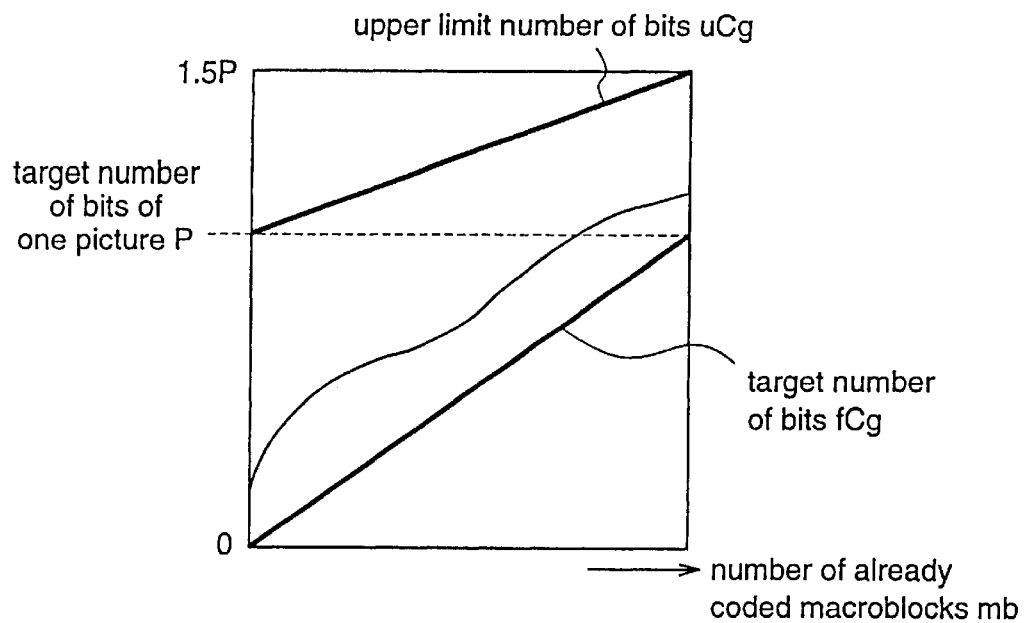
FIG. 10 is a graph showing changes in the target number of bits fCg and the upper limit number of bits uCg with the progress of the coding in one picture, in a case where the upper limit number of bits uCg exceeds the target number of bits of one picture P.

FIG. 10 is a diagram showing an example of the relationship between the target number of bits fCg and the upper limit number of bits uCg when the upper limit number of bits uCg is decided so as to exceed the target number of bits of one picture P.

The target number of bits fCg at the end of the picture is set at the target number of bits of one picture P. Then, the upper limit number of bits uCg is decided so as to be increased from the target number of bits of one picture P to 1.5 P by a prescribed bit amount from the picture head to the picture end.

In this example, in the decoding apparatus which decodes the bitstream Eg3 which is generated by coding a video signal of 60 fields per second using the moving picture coding apparatus 100 of the first embodiment with coding one field as one picture, the delay time taken to decode each picture is 1.5/60 sec and increased with relative to 1/40 sec or 1/60 sec. However, the cumulative number of generated bits of one picture can exceed the target number of bits of one picture P, whereby the bitstream having a good image quality can be generated. In addition, in a case where the decoding apparatus can start decoding one picture before data of the picture are stored in the input buffer, when the upper limit number of bits uCg is decided so as to exceed the target number of bits of one picture P, the image quality of the video after decoding can be improved as well as the delay time of the decoding in the decoding apparatus can be reduced.

The moving picture coding apparatus of the first embodiment can have a structure comprising a code amount control unit changing means for changing the code amount control unit according to the delay time taken to decode coded data as the output of the moving picture coding apparatus in the decoding apparatus for decoding the coded data.

Thereby, when the decoding apparatus can start decoding one picture before data of the picture are stored in the input buffer, the code amount control unit can be a unit smaller than one picture, whereby the delay time in the decoding apparatus can be further reduced.

For example, when the code amount control unit is one-third of one picture, the decoding apparatus can perform the decoding without overflow or underflow of the buffer with the delay time of one-180th second in cases of a video signal of 60 fields per second. Here, the code amount control unit can be a unit which is larger than one picture.

The quantization scale decision function is not limited to the definitions of the expressions (4) to (8). For example, the values of the parameters in the expressions (4) to (8) can be changed. Further, another function which is monotonously increased with the increase in the normalized error in the number of generated bits, such a linear function, may be used.

[Embodiment 2]

In the rate control unit 2 of the moving picture coding apparatus 100 according to the first embodiment, the value which is obtained by dividing the output bit rate R of the moving picture coding apparatus 100 by a picture rate is uniformly set for all pictures as the target number of bits of one picture P. Then, the target number of bits fCg of a macroblock in the picture is decided so as to be linearly increased from 0 bit to the target number of bits of one picture P with the increase in the number of already coded macroblocks as well as the upper limit number of bits uCg for each picture is decided, so that the cumulative number of generated bits per picture Cg approaches the target number of bits of one picture P. Accordingly, the number of generated bit for each picture as the code amount control unit can be controlled to have a fixed amount.

However, even when the number of generated bits for each picture is controlled to have the fixed amount, for example, the distribution of the number of coded generated bits after coding in the screen in the case where the quantization is performed at a fixed quantization scale is uneven, because the degree of coding difficulty varies with slices or macroblocks according to the contents of the input video. Therefore, the distribution of the number of generated bits in the screen varies with pictures.

Thus, in a moving picture coding apparatus according to the second embodiment, a rate control unit 2$a$ obtains the degree Ci of coding difficulty of each slice in the previous picture, obtains the target number of bits TSi for each slice of the subsequent picture on the basis of the distribution of the degree Ci of coding difficulty of each slice, and sets the target number of bits of the picture T on the basis of the distribution of the obtained target number of bits TSi, as well as sets the upper limit number of bits U on the basis of the target number of bits T, so as to equalize the image quality of the picture, by making the number of generated bits for each picture approach a fixed amount.

The distribution of the target number of bits TSi of the subsequent picture is obtained from the distribution of the degree Ci of coding difficulty of the previous picture, by utilizing the fact that contiguous pictures have the strong tendency of a similar distribution of the degree of coding difficulty in the screen.

The degree of coding difficulty is defined in the MPEG coding method. The degree of coding difficulty on the basis of the complexity of video is represented by a value which is obtained by multiplying the number of bits generated per unit area by the average quantization scale in the unit area.

Figure 11:
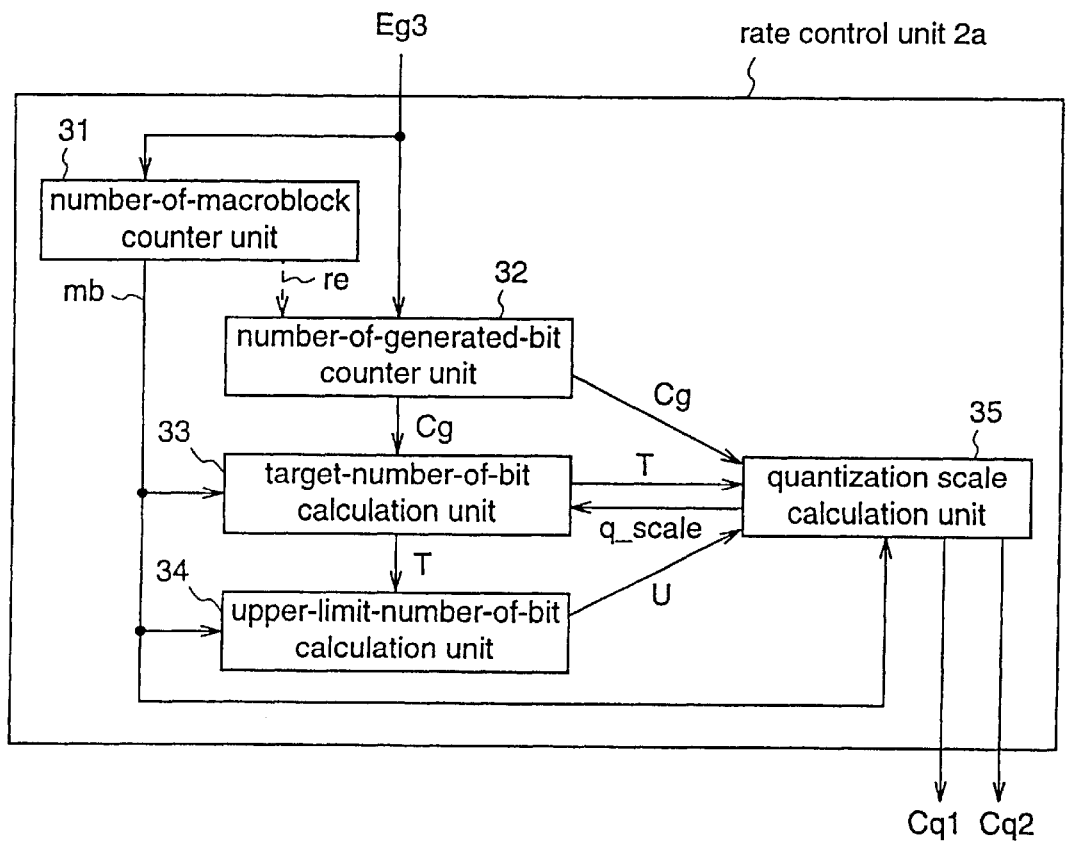
FIG. 11 is a diagram for explaining a rate control unit 2a of a moving picture coding apparatus according to a second embodiment of the present invention.

FIG. 11 is a block diagram illustrating a structure of the rate control apparatus 2$a$ of the moving picture coding apparatus according to the second embodiment.

In this figure, a counter unit (hereinafter also referred to as a number-of-macroblock counter unit) 31 receives the output bitstream Eg3 which has been coded by the moving picture coding apparatus and counts the number of already coded macroblocks mb in a picture of the input bitstream Eg3, as well as generates a reset signal re when the last macroblock in the picture is counted. A counter unit (hereinafter also referred to as number-of-generated-bit counter unit) 32 receives the output bitstream Eg3 which has been coded by the moving picture cooling apparatus, and counts the cumulative number of generated bits Cg generated in from the first macroblock in the picture to a macroblock which is being coded on the basis of the input bitstream Eg3 and the reset signal re from the counter unit 31. A calculation unit (hereinafter also referred to as target-number-of-bit calculation unit) 33 obtains the degree Ci of coding difficulty of each slice of the previous picture on the basis of the cumulative number of generated bits Cg from the counter unit 32 and a quantization scale q_scale, calculates the target number of bits TSi of each slice in the subsequent picture on the basis of the distribution of the obtained degree Ci of coding difficulty of the previous picture and the number of macroblocks mb from the counter unit 31, and obtains the target number of bits T of a macroblock in the picture from the distribution of the calculated target number of bits TSi of the subsequent picture. A calculation unit (hereinafter also referred to as upper-limit-number-of-bit calculation unit) 34 calculates the upper limit number of bits U on the basis of the number of macroblocks mb from the counter unit 31 and the target number of bits T from the calculation unit 33. A quantization scale calculation unit 35 calculates a quantization scale q_scale on the basis of the number of macroblocks bm from the counter unit 31, and the upper limit number of bits U from the calculation unit 34.

To be specific, in the rate control unit 2a according to the second embodiment, the target-number-bit calculation unit 33 receives the number of macroblocks mb from the counter unit 31 as well as receives the cumulative number of generated bits Cg from the counter unit 32 and the quantization scale q_scale from the quantization scale calculation unit 35 to obtain the degree Ci of coding difficulty of each slice of the previous picture. The upper-limit-number-of-bit calculation unit 34 receives the number of macroblocks mb from the counter unit 31 as well as receives the target number of bits T from the calculation unit 33 so that the obtained upper limit number of bits U varies according to the target number of bits T calculated by the calculation unit 33.

The other construction of the moving picture coding apparatus of the second embodiment is the same as that of the moving picture coding apparatus 100 of the first embodiment.

Next, the operation of the moving picture coding apparatus of the second embodiment is described.

In this moving picture coding apparatus of the second embodiment, the operations of the elements constituting the moving picture coding apparatus except the rate control unit 2a are the same as those in the moving picture coding apparatus 100 of the first embodiment. Therefore, only the operation of the rate control unit 2a is hereinafter described in detail.

Initially, the output bitstream Eg3 which has been coded by the moving picture coding apparatus is input to the number-of-macroblock counter unit 31 and the number-of-generated-bit counter unit 32.

In the counter unit 31, the number of already coded macroblocks mb in the picture of the input bitstream Eg3 is counted. The counted number of macroblocks mb is output to the target-number-of-bit calculation unit 33, the upper-limit-number-of-bit calculation unit 34, and the quantization scale calculation unit 35.

In the counter unit 32, the cumulative number of generated bits Cg of the input bitstream Eg3 is counted. The counted cumulative number of generated bits Cg is output to the calculation unit 33 and the calculation unit 35. When the counting of the number of macroblocks mb in one picture is finished in the counter unit 31, the reset signal re for resetting the count of the cumulative number of generated bits Cg is output to the counter unit 32. In the counter unit 32, the count is reset and then the counting of the number of generated bits in the subsequent picture is started.

In the calculation unit 33, the degree Ci of coding difficulty of each slice in the previous picture which has been coded one picture before a picture to be coded is obtained on the basis of the cumulative number of generated bits Cg from the counter unit 32 and the quantization scale q_scale from the quantization scale calculation unit 35. The target number of bits TSi of each slice of a picture subsequent to the previous picture, i.e., the picture to be coded is obtained on the basis of the distribution of the obtained degree Ci of coding difficulty of the previous picture and the number of macroblocks mb from the counter unit 31. The target number of bits T of a macroblock which is being coded is calculated on the basis of the distribution of the obtained target number of bits T. The calculated target number of bits T is output to the calculation unit 34 and the calculation unit 35.

In the calculation unit 34, the upper limit number of bits U is calculated on the basis of the number of macroblocks mb from the counter unit 31 and the target number of bits T from the calculation unit 33. The calculated upper limit number of bits U is output to the quantization scale calculation unit 35.

In the quantization scale calculation unit 35, the reference quantization scale q_st is obtained on the basis of the output bit rate R of the moving picture coding apparatus. The quantization scale q_scale is calculated on the basis of the reference quantization scale q_st, the cumulative number of generated bits Cg from the counter unit 32, the target number of bits T from the counter unit 33, and the upper limit number of bits U from the calculation unit 34. The calculated quantization scale q_scale is output to the basic coding processing unit 1, as well as output to the calculation unit 33. In addition, in the quantization scale calculation unit 35, when the cumulative number of generated bits Cg exceeds the upper limit number of bits uCg in the middle of the coding of the picture, an underflow avoidance signal uf for avoiding the underflow of the excess number by skipping the coding of a macroblock is generated. Further, in the quantization scale calculation unit 35, when the cumulative number of generated bits Cg of one picture does not reach the target number of bits of one picture P even when the coding of the last macroblock in the picture has been finished, the cumulative number of generated bits Cg of one picture is subtracted from the target number of bits of one picture P, thereby calculating the number sbt of stuffing bits.

Figure 12:
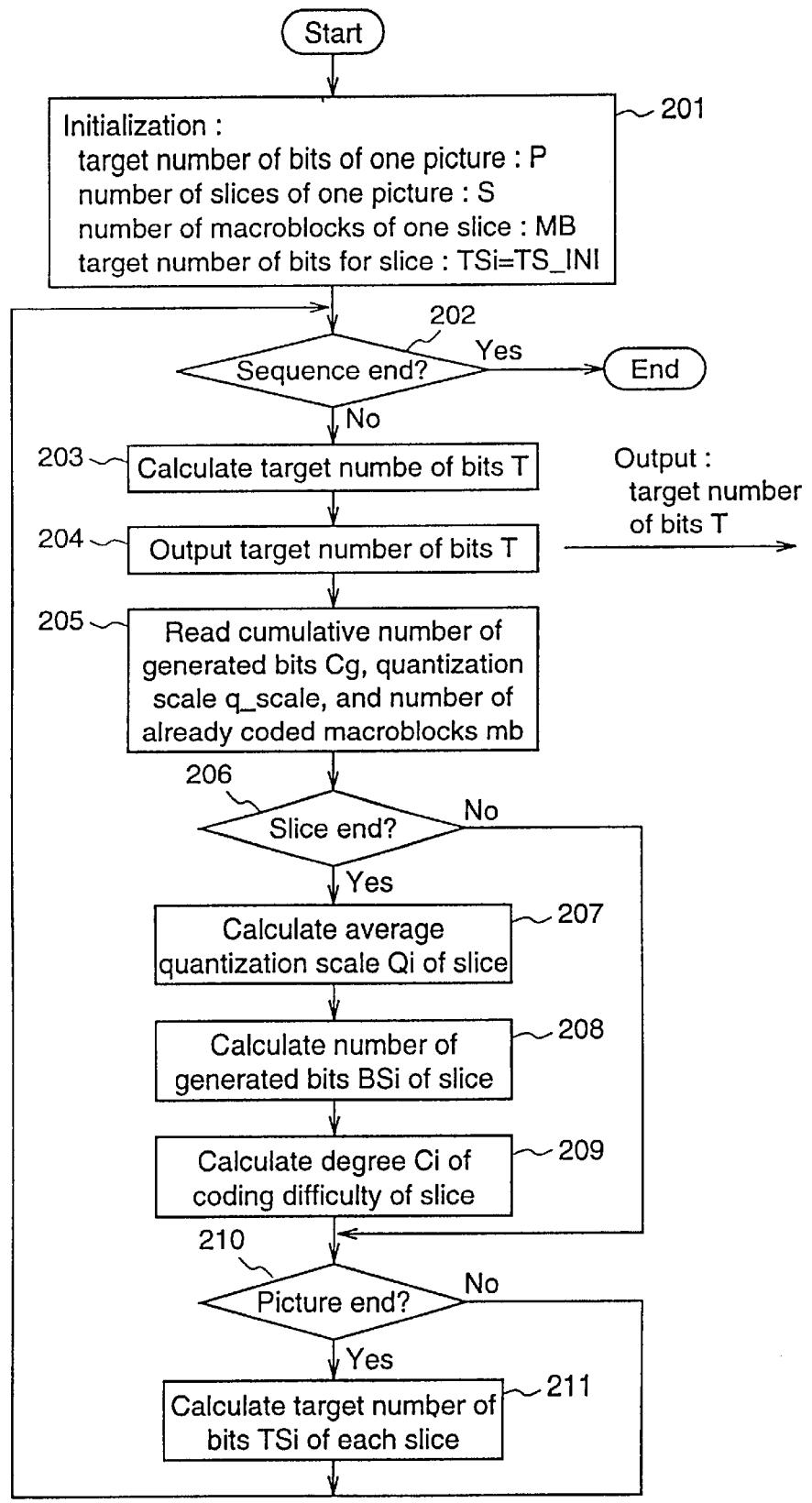
FIG. 12 is a flowchart for explaining the operation of a calculation unit 33 for calculating the target number of bits in the second embodiment.

Then, the operation of the calculation unit 33 is described with reference to the flowchart of FIG. 12.

Initially, in step 201, the initial value of the target number of bits TS_INI of one slice is obtained from the target number of bits of one picture P and the number of slices S of one picture on the basis of the following expression (9):

$$TS\_INI = P \times \alpha / S \qquad (9)$$

Here, $\alpha$ is a real value satisfying $0 < \alpha \leqq 1$. The target number of bits P of one picture is obtained by the quantization scale calculation unit 35. This value is a value which is obtained by dividing the output bit rate R by the picture rate. The number of slices S of one picture is a value which is previously set in the moving picture coding apparatus of the second embodiment.

The so-obtained target number of bits TS_INI of one slice is equally allocated to each slice in the screen as the target number of bits TSi (i=0–s–1) of each slice in the picture to be coded first in the video signal Sin.

In step 202, it is judged on the basis of the number of macroblocks mb which is input from the counter unit 31 whether a macroblock which is being coded is the last macroblock in the video signal, i.e., whether the coding of the video signal has been finished. In this case, when the coding of the video signal has been finished, the calculation process in the calculation unit 33 is finished. When the coding of the video signal has not been finished, the operation proceeds to step 203.

In step 203, the target number of bits T at the position of the macroblock which is being coded is calculated from the target number of bits of TSi each slice in the picture on the basis of the following expression (10). Then, the operation proceeds to step 204.

$$T = \sum_{i=0}^{m-1} TSi + \frac{TSm \times n}{\text{the number of macroblocks } MB \text{ of one slice}} \qquad (10)$$

Here, m is the number of slices in which all macroblocks have been coded and n is the number of already coded macroblocks in a slice which is being coded now.

To be specific, the target numbers of generated bits Tsi (i=0–m–1) of respective already coded slices in the picture are added. Then, the value which is obtained by this addition and a value which is obtained by multiplying the target number of bits TSm of the slice which is being coded by the ratio of the number of already coded macroblocks n in the slice to the number of macroblocks MB of one slice are added. In this way, the target number of bits T at the position of the macroblock which is being coded is obtained.

In step 204, the target number of bits T obtained in step 203 is output to the quantization scale calculation unit 35 and the operation proceeds to step 205.

In step 205, the number of already coded macroblocks mb is read from the counter unit 31. The cumulative number of generated bits Cg is read from the counter unit 32. The quantization scale $q_{13}$ scale of each macroblock in the slice of the previous picture is read from the calculation unit 35. Then, the operation proceeds to step 206.

In step 206, whether the slice has been coded to the end is decided from the number of macroblocks mb which has been read in step 205.

At this time, when the coding of the slice has been finished up to the end, the operation proceeds to step 207. On the other hand, when the coding of the end of the slice has not been finished, the operation proceeds to step 210.

In step 207, the average quantization scale Qi per macroblock in the slice is obtained from the quantization scales q_scale of the respective macroblocks in the slice of the previous picture which have been read in step 205. Then, the operation proceeds to step 208.

In step 208, the number of generated bits of one slice BSi is obtained from the cumulative number of generated bits Cg which has been read in step 205. Then, the operation proceeds to step 209.

In step 209, the degree Ci of coding difficulty of the slice is obtained from the average quantization scale Qi per macroblock in the slice which has been calculated in step 207 and the number of generated bits BSi of one slice which has been calculated in step 208, on the basis of the following expression (11). Then, the operation proceeds to step 210.

$$Ci = Qi \times BSi \qquad (11)$$

In step 210, whether the picture has been coded up to the end is decided from the number of macroblocks mb which has been read in step 205. When the coding of the picture has been finished, the operation proceeds to step 211. When the coding of the picture has not been finished, the operation returns to step 202.

In step 211, on the basis of the degree Ci of coding difficulty of each slice of the previous picture which has been obtained in step 209, the target number of bits TSi ( i=0–s–1) of each slice in the subsequent picture is obtained on the basis of the following expression (12).

$$TSi = P \times \alpha \times \frac{Ci}{\sum_{j=0}^{c-1} Cj} \qquad (12)$$

To be specific, the target number of bits TSi of each slice is obtained by allocating the target number of bits per picture P to each slice on the basis of a rate of the degree of coding difficulty of each slice to the degree of coding difficulty of all slices so that more bits are allocated from the target number of bits per picture P as the target number of bits TSi to a slice having a larger degree of coding difficulty than the degree of coding difficulty of all slices and less bits are allocated from the target number of bits per picture P as the target number of bits TSi to a slice having a smaller degree of coding difficulty than the degree of coding difficulty of all slices.

The above-mentioned steps are repeated for each macroblock

As described above, according to the moving picture coding apparatus of the second embodiment, the input video signal is coded with controlling the number of generated bits in each picture so as to be a fixed value which is equal to the target number of bits per picture. Therefore, the delay in the decoding process in the decoding apparatus for the coded data which have been generated by the moving picture coding apparatus can be reduced. In addition, by utilizing the fact utilizing the fact that contiguous pictures have a large tendency to have a similar distribution of degree Ci of coding difficulty in a screen, and on the basis of the distribution of the degree Ci of coding difficulty of the previous picture, the target number of bits T of each macroblock of the subsequent picture is obtained. Therefore, a bitstream whose image quality of video, obtained by the decoding of the video, is uniform in the screen, can be generated.

Here, the upper limit number of bits U can be also changed adaptively according to the degree Ci of coding difficulty or the like, as the target number of bits T.

[Embodiment 3]

In the moving picture coding apparatus of the first or second embodiment, the same quantization scale decision function is used for all pictures. The quantization scale is set to have a larger value so as not to cause breaking of a screen even when the same quantization scale decision function is used for all pictures, thereby being made to conform to the degrees of coding difficulty of all input video. Accordingly, the same quantization scale decision function can be used for all pictures without breaking up of the screen, regardless of the degree of coding difficulty which varies with the contents of the input video.

However, in the quantization scale decision method of the moving picture coding apparatus according to the first or second embodiment, a larger quantization scale is decided also for video having a lower degree of coding difficulty. Therefore, the image quality after the coding is performed is decreased.

Figure 19:
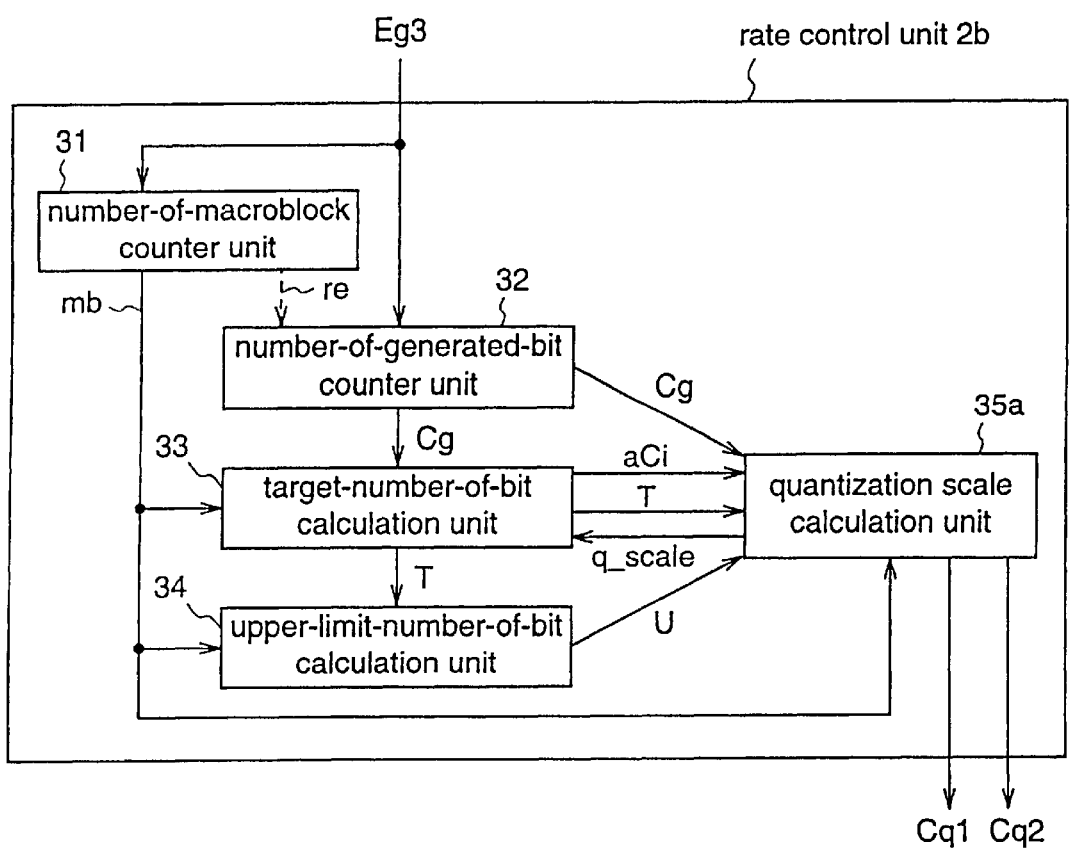
FIG. 19 is a diagram illustrating a structure of a rate control unit 2b of a moving picture coding apparatus according to a third embodiment of the present invention.

FIG. 19 is a block diagram illustrating a structure of a rate control unit 2b of a moving picture coding apparatus according to the third embodiment. In the moving picture coding apparatus of the third embodiment, the rate control unit 2b decides the value of the quantization scale to be larger or smaller for the whole picture on the basis of the degree of coding difficulty of the picture.

To be more specific, a quantization scale calculation unit 35a of the rate control unit 2b sets a threshold V according to the output bit rate R of the moving picture coding apparatus as well as receives the sum aCi of the degrees of coding difficulty of all slices in the picture obtained by the calculation unit 33 after the picture has been coded to the end, changes a reference quantization scale q_st of the quantization scale decision function for each picture according to the relationship between the threshold V and the degree aCi of coding difficulty of each picture, and calculates the quantization scale using a newly set quantization scale decision function.

The other construction of the moving picture coding apparatus of the third embodiment is the same as that of the moving picture coding apparatus of the second embodiment.

Next, the operation of the moving picture coding apparatus of the third embodiment will be described.

In this moving picture coding apparatus of the third embodiment, the operations of the elements constituting the moving picture coding apparatus other than the rate control unit 2b are the same as those of the moving picture coding apparatus of the second embodiment. Only the operation of the quantization scale calculation unit 35a in the rate control unit 2b is different from that in the second embodiment. Therefore, only the operation of the quantization scale calculation unit 35a of the rate control unit 2b will be described in detail.

The quantization scale calculation unit 35a receives the sum aCi of the degrees of coding difficulty of all slices in a picture from the calculation unit 33 after the coding of the last slice in the picture has been finished as well as sets the threshold V according to the output bit rate of the moving picture coding apparatus, and decides the reference quantization scale q_st of the reference quantization scale decision function on the basis of the relationship between the input value aCi of the degree of the coding difficulty from the calculation unit 33 and the set threshold V.

To be more specific, when the value aCi of the degree of the coding difficulty from the calculation unit 33 is smaller than the set threshold V, the reference quantization scale q_st of the reference quantization scale decision function is set at a value which is obtained by subtracting 1 from the value of the reference quantization scale q_st which has been set at the initialization. When the value aCi of the degree of the coding difficulty from the calculation unit 33 is equal to or larger than the set threshold V, the reference quantization scale q_st of the reference quantization scale decision function is set at the value of the reference quantization scale which has been set at the initialization. For example, in the case where the output bit rate is 6 Mbps, the reference quantization scale q_st at the initialization is 7 and the threshold V is set at 500,000, and when the degree aCi of coding difficulty of a coded picture is smaller than 500,000, the reference quantization scale q_st for coding of the subsequent picture is set at 6. When the degree aCi of coding difficulty of the coded picture is equal to or larger than 500,000, the reference quantization scale q_st is set at 7.

As described above, in the quantization scale calculation unit 35a, on the basis of the degree aCi of the coding difficulty of the previous picture, the value of the reference quantization scale q_st of the reference quantization scale decision function of the subsequent picture is decided. Then, the quantization scale is obtained on the basis of the newly set reference quantization scale decision function.

As described above, according to the moving picture coding apparatus of the third embodiment, on the basis of the degree aCi of coding difficulty of the previous picture, the reference quantization scale q_st of the quantization scale decision function which is to be used at the coding of the subsequent picture can be changed adaptively, Therefore, a picture having a lower degree aCi of coding difficulty can be coded with a decreased value of the quantization scale, whereby the image quality can be improved.

In this third embodiment, the reference quantization scale q_st is changed according to the degree aCi of coding difficulty of the picture. However, the reference quantization scale q_st may be changed according to the average value of the quantization scales in the picture, the value of the quantization scale of the last macroblock in the picture or the like. In addition, values other than the reference quantization scale q_st of the quantization scale decision function can be changed. In this third embodiment, the reference quantization scale is changed between two values. However, this can be changed among three or more values.

[Embodiment 4]

In a moving picture coding apparatus according to the fourth embodiment, a quantization scale calculation unit 45 calculates the quantization scale using a quantization scale decision function in which the change in the quantization scale relative to the change in the ratio of an error in the number of generated bits as a difference between the cumulative number of generated bits Cg and the target number of bits fCg, to a tolerance of the number of generated bits as a difference between the upper limit number of bits uCg and the target number of bits fCg has hysteresis characteristics, i.e., the graph varies with the cases where the normalized error D in the number of generated bits is increased and decreased.

The other construction of the moving picture coding apparatus of the fourth embodiment is the same as that of the moving picture coding apparatus of any of the first to third embodiments.

Next, the operation of the moving picture coding apparatus of the fourth embodiment will be described.

In this moving picture coding apparatus of the fourth embodiment, the operations of the elements constituting the moving picture coding apparatus other than the quantization scale calculation unit 45 are the same as those in the moving picture coding apparatus of any of the first to third embodiments. Therefore, only the operation of the quantization scale calculation unit 45 will be described in detail.

Figure 13:
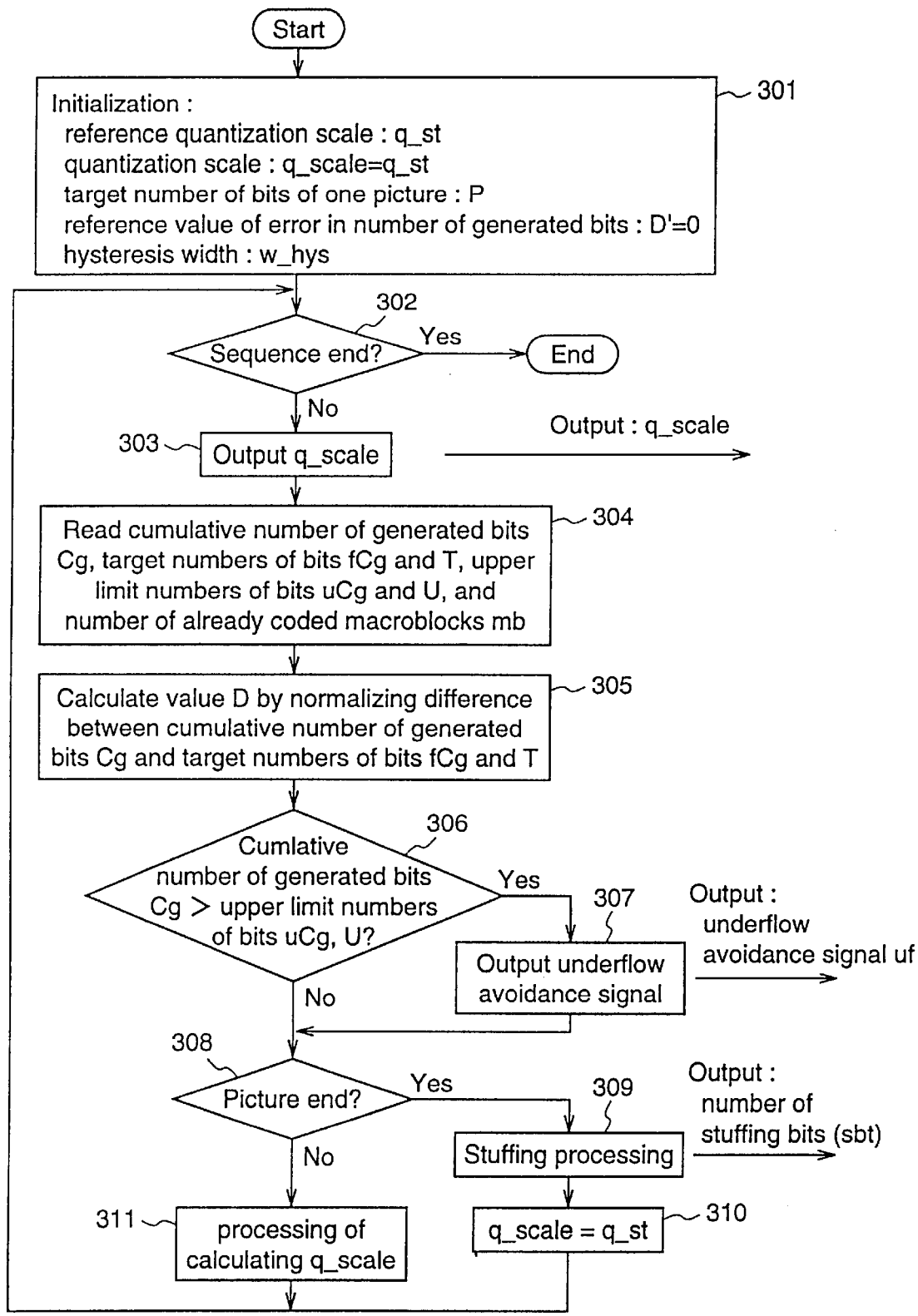
FIG. 13 is a flowchart for explaining the operation of a quantization scale calculation unit 25 in a fourth embodiment of the present invention.

FIG. 13 is a flowchart for explaining the operation of the quantization scale calculation unit 45 in the moving picture coding apparatus of the fourth embodiment.

Figure 5:
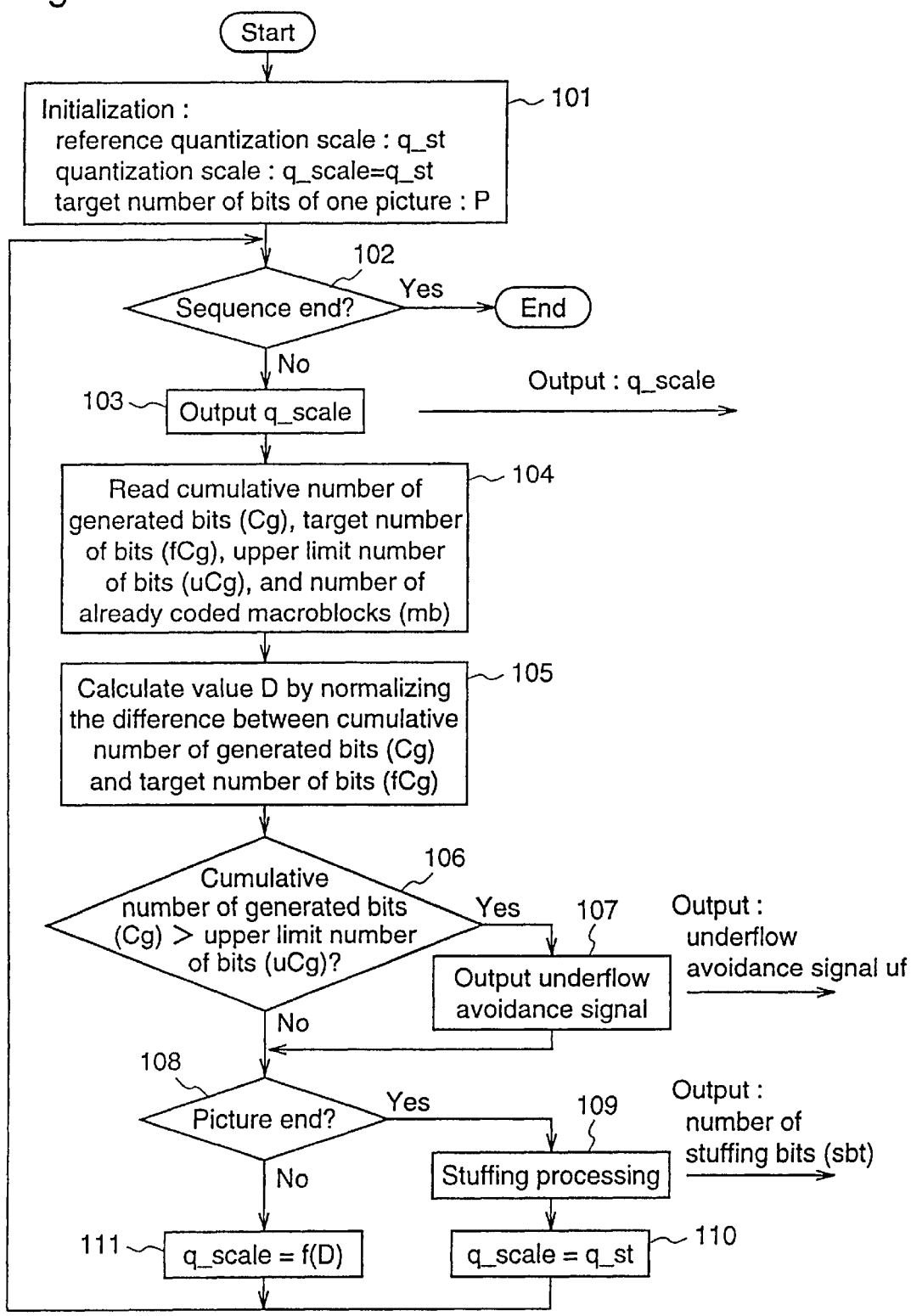
FIG. 5 is a flowchart for explaining the operation of a quantization scale calculation unit 25 of the first embodiment.

Here, steps 301 to 310 are the same as steps 101 to 110 in the flowchart as shown in FIG. 5. Only the processing in step 311 is different.

In step 311, a q_scale calculation process is performed for calculating the quantization scale $q_{13}$ scale by using the quantization scale decision function having the hysteresis characteristics, i.e., having the graph which varies with the cases where the normalized error D in the number of generated bits is increased and decreased. Then, the operation returns to step 302.

Figure 14:
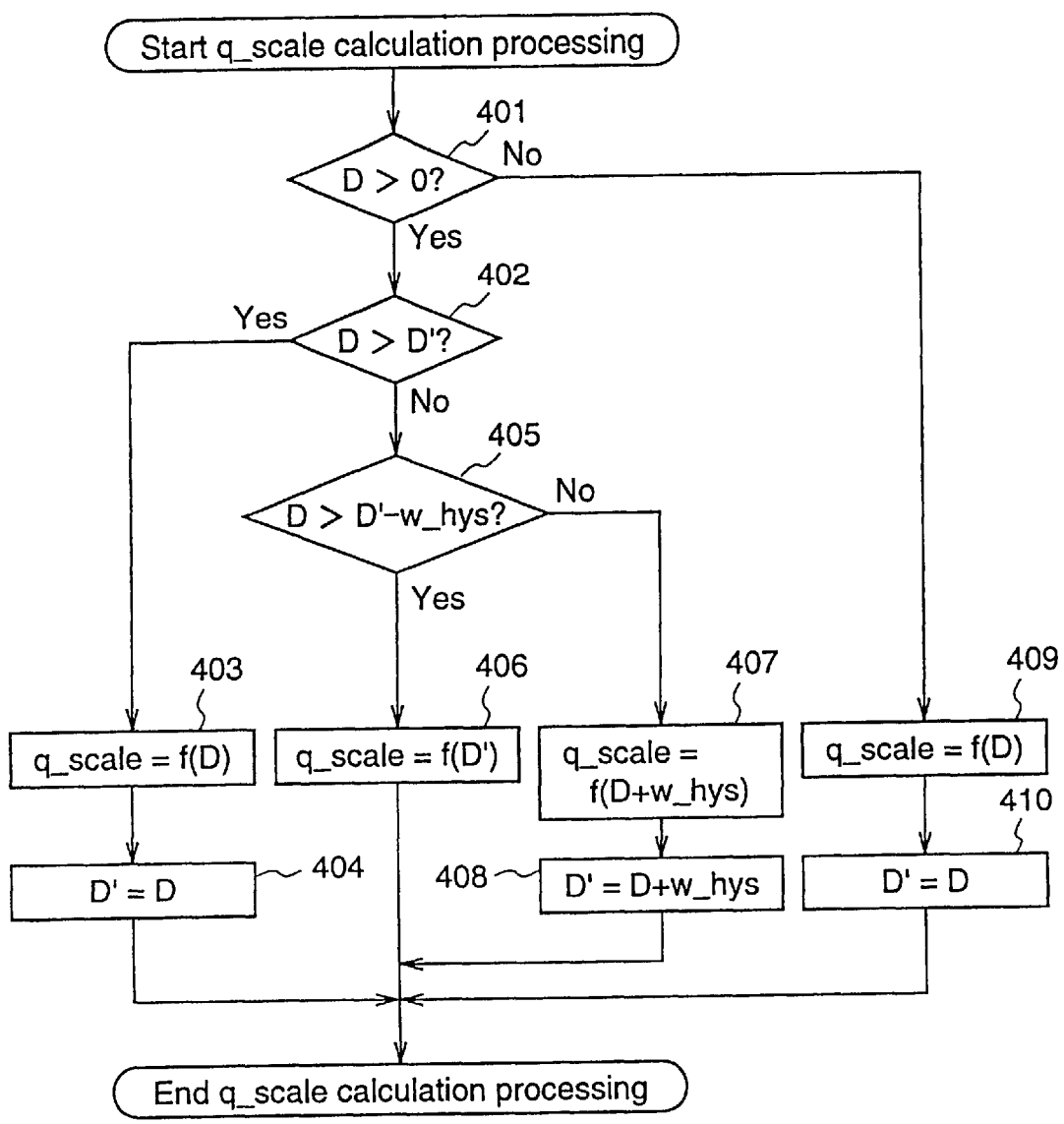
FIG. 14 is a flowchart for explaining a process of calculating a quantization scale q_scale of the fourth embodiment.

The q_scale calculation processing in step 311 is described in more detail with reference to the flowchart of FIG. 14.

In this fourth embodiment, a reference value D' of the error in the number of generated bits is introduced as well as a hysteresis width w_hys is set, so that the quantization scale q_scale is changed with the change in the normalized error D in the number of generated bits, with possessing the hysteresis characteristics. At the initialization, the reference valueD' of the error in the number of generated bits is set at 0.

Initially, in step 401, the normalized error D in the number of generated bits is compared with 0. When the normalized error D in the number of generated bits is equal to or smaller than 0, the operation proceeds to step 409. In step 409, the quantization scale $q_{13}$ scale is set to be f(D) using the quantization scale decision function f(x). Then, the operation proceeds to step 410 and the normalized error D in the number of generated bits is substituted for the reference valueD' of the error in the number of generated bits.

When it is decided in step 401 that the normalized error D in the number of generated bits is larger than 0, the operation proceeds to step 402. In step 402, the normalized error D in the number of generated bits is compared with the reference value D' of the error in the number of generated bits. When the normalized error D in the number of generated bits is larger than the reference value D' of the error in the number of generated bits, the operation proceeds to step 403. In step 403, the quantization scale q_scale is set to be f(D). Then, the operation proceeds to step 404. In step 404, the normalized error D in the number of generated bits is substituted for the reference value D' of the error in the number of generated bits.

In addition, when it is decided in step 402 that the normalized error D in the number of generated bits is equal to or smaller than the reference value D' of the error in the number of generated bits, the operation proceeds to step 405. In step 405, the normalized error D in the number of generated bits is compared with a value which is obtained by subtracting the hysteresis width w_hys from the reference value D' of the error in the number of generated bits. When the normalized error D in the number of generated bits is larger than the value which is obtained by subtracting the hysteresis width w_hys from the reference value D' of the error in the number of generated bits, the operation proceeds to step 406. Then in step 406, the quantization scale q_scale is assumed to be f(D').

When it is decided in step 405 that the normalized error D in the number of generated bits is equal to or smaller than the value which is obtained by subtracting the hysteresis width w_hys from the reference value D' of the error in the number of generated bits, the operation proceeds to step 407. In step 407, the quantization scale q_scale is assumed to be f(D+w_hys). Further, the operation proceeds to step 408. In step 408, a value which is obtained by adding the normalized error D in the number of generated bits and the hysteresis width w_hys is substituted for the reference value D' of the error in the number of generated bits.

The changes in the quantization scale by the aforementioned operation are described with reference to FIGS. 15(a)–15(d).

FIGS. 15(a)–15(d) are diagrams showing how the quantization scale changes according to the normalized error in the number of generated bits.

In these figures, full lines represent the quantization scale decision function f(x). Dotted lines represent a quantization scale decision function f(x+w_hys) which is the quantization scale decision function f(x) having the hysteresis width.

Figure 15:
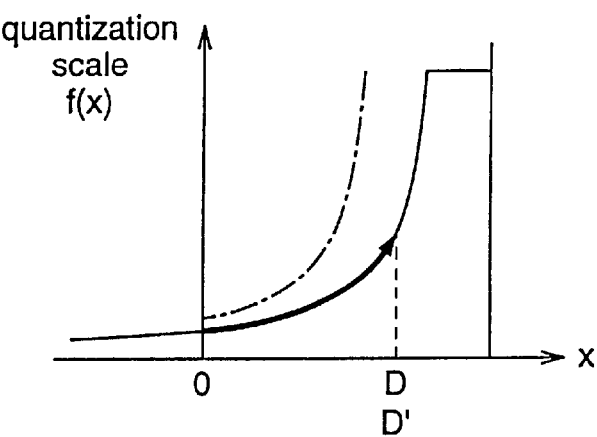
FIGS. 15(a)–15(d) are graphs showing changes in the quantization scale which is calculated by using a quantization scale decision function having hysteresis characteristics.
Figure 15:
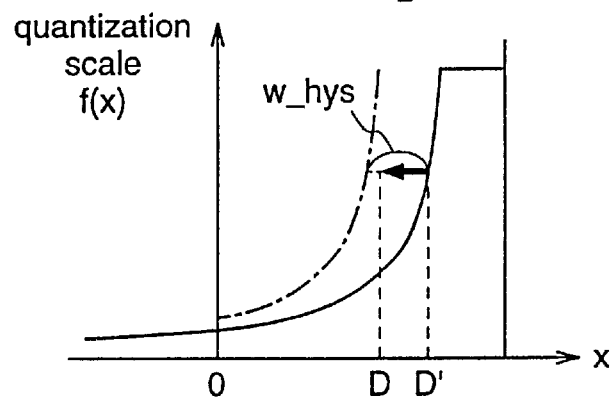
Figure 15:
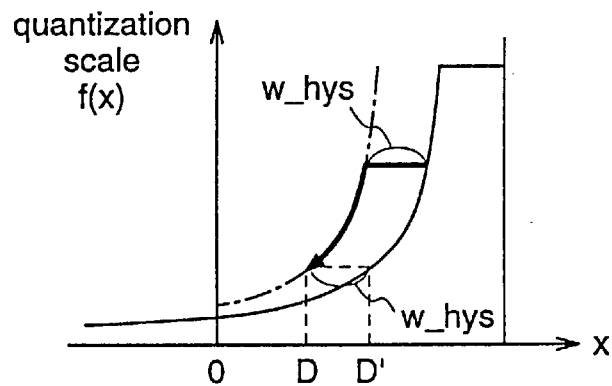
Figure 15:
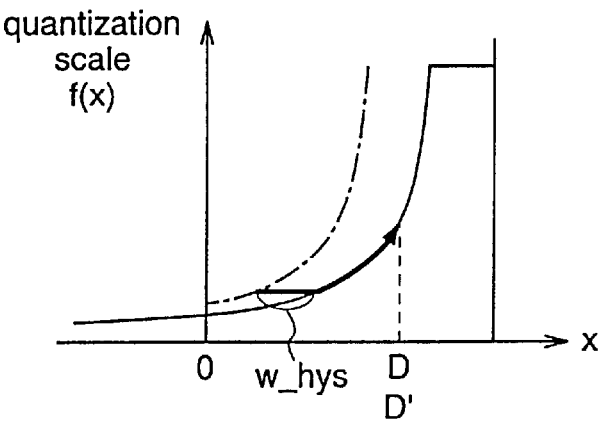

Initially, as shown in FIG. 15(a), when the normalized error D in the number of generated bits is increased from the initial state, the quantization scale q_scale is increased on the basis of the quantization scale decision function f(x). In this case, D and D' have the same value.

From this state, when D becomes smaller than D' as shown in FIG. 15(b), i.e., when the normalized error D in the number of generated bits is decreased, the quantization scale g_scale is shifted to the left on the graph with remaining at the same value.

Further, when the normalized error D in the number of generated bits is decreased and the difference between D and D' becomes larger than w_hys as shown in FIG. 15(c), the quantization scale q_scale is reduced according to the quantization scale decision function f(x+w_hys) which is obtained by shifting the quantization scale decision function f(x) by the size of w_hys to the left.

When the normalized error D in the number of generated bits is increased from this state, the quantization scale q_scale is shifted to the right on the graph with remaining at the same value until D and D' have the same value. After D and D' coincide, the quantization scale q_scale is increased in accordance with the quantization scale decision function f(x) again as shown in FIG. 15(d).

As described above, according to the moving picture coding apparatus of the fourth embodiment, the quantization scale is calculated using the quantization scale decision function having the hysteresis characteristics, which has the graphs varying with cases where the normalized error D in the number of generated bits is increased and decreased. Therefore, even when the degree of coding difficulty is greatly increased or decreased in the screen, large changes in the quantization scale can be suppressed, whereby large changes in the image quality in the screen can be suppressed.

Here, the method of the coding which is performed in the basic coding processing unit 1 in any of the first to fourth embodiments is not limited to the MPEG coding method. Other coding method for performing the rate control on the basis of the quantization scale, such as H0.261, can be used.

[Embodiment 5]

In the moving picture coding apparatus 100 according to the first embodiment, the position of the area to be intra-coded in each of the second to the last P pictures arranged in the video signal Sin except for I picture at the head of the video signal Sin is periodically transitioned in the order of the arrangement of the P pictures in the video signal Sin. Thereby, the screen can be refreshed after the error arises, without inserting I picture in the middle.

However, assuming that the position of the intra-coded area in the screen makes a circuit in a cycle of 15 frames, when an error has arisen in the intra-coded area, the subsequent 15 frames include noises.

Hereinafter, a moving picture coding apparatus according to the fifth embodiment which can solve this problem will be described.

Figure 16:
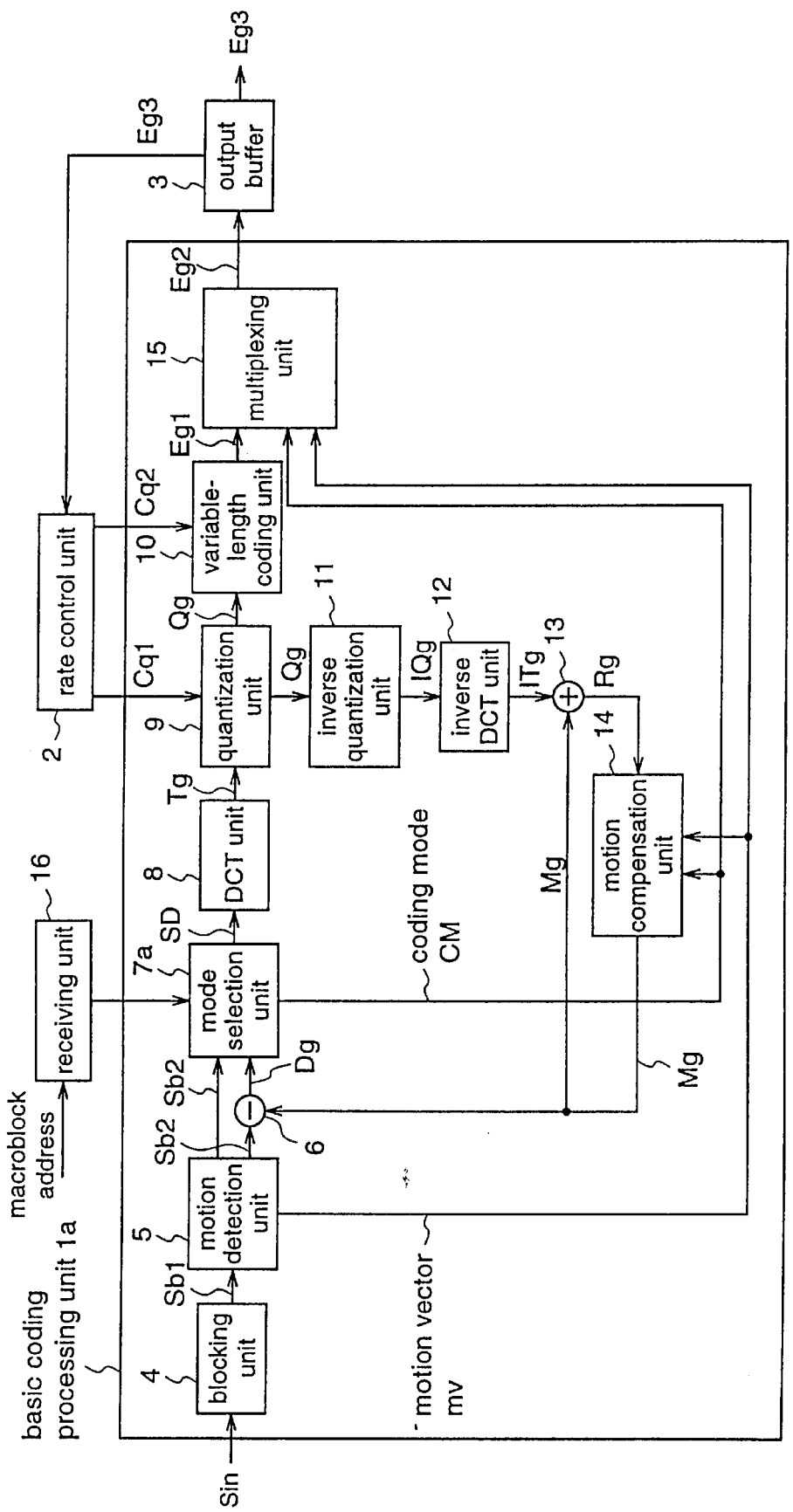
FIG. 16 is a diagram for explaining a structure of a moving picture coding apparatus 500 according to a fifth embodiment of the present invention.

FIG. 16 is a block diagram illustrating a structure of the moving picture coding apparatus of the fifth embodiment.

In this figure, reference numeral 500 denotes the moving picture coding apparatus. A receiving unit 16 (receiving means) receives a macroblock address of a macroblock including an error, which address is transmitted by a decoding apparatus for decoding coded data Eg3 from the apparatus 500 when the error has been detected in the coded data Eg3 by the decoding apparatus. A mode selection unit 7a selects one of the intra-coding mode and the differential coding mode as a coding mode of a macroblock to be coded, and outputs one of an output Sb2 from a motion detection unit 5 and an output Dg from a subtraction unit 6 on the basis of the selected coding mode as well as output the selected coding mode CM. The mode selection unit 7a includes an intra area transition means for successively transitioning the position of an area to be intra-coded in each of P pictures arranged in the video signal Sin in the order of the arrangement of the P pictures in the video signal Sin, and when an error arises in coded data of the video signal Sin, transitioning the position of an area to be intra-coded in the subsequent picture to the position of the error arose in P picture on the basis of the address received from the receiving unit 16, thereby specifying the area to be intra-coded.

The other construction of the moving picture coding apparatus 500 is the same as that of the moving picture coding apparatus 100 of the first embodiment.

Next, the operation of the moving picture coding apparatus of the fifth embodiment is described.

In this fifth embodiment, the operations of elements constituting the moving picture coding apparatus 500, except the receiving unit 16 and the intra area transition means in the mode selection unit 7a are the same as those in the moving picture coding apparatus 100 of the first embodiment. Therefore, only the operations of the receiving unit 16 and the intra area transition means in the mode selection unit 7a are described in detail.

Initially, when an error is detected in a received output bitstream Eg3 by a decoding apparatus for decoding the output bitstream Eg3 of the moving picture coding apparatus 500 of the fifth embodiment, the address of a macroblock including the error is output to the receiving unit 16 of the moving picture coding apparatus 500.

The receiving unit 16 receives the address of the macroblock from the decoding apparatus and outputs the received address of the macroblock to the mode selection unit 7a.

When the mode selection unit 7a receives the macroblock address from the receiving unit 16, the intra area transition means calculates the address of an area including the received macroblock address on the basis of the macroblock address from the receiving unit 16. Then, it transitions an area to be intra-coded of the subsequent frame to the position at the calculated address, thereby specifying the area to be intra-coded. The area to be intra-coded in each of the subsequent frames is successively transitioned in the order of the frames arranged in the video signal Sin, following to the address in which the error arises in the screen.

FIG. 17 is a diagram showing the addresses of the intra areas. When no error arises, the area to be intra-coded is successively transitioned from 1 to 15, frame by frame. When the area 15 has been intra-coded, the process returns to the area 1.

For example, in the case where an error arises in a macroblock included in the area 3 when an intra-coded area in the previous frame is the area 13, the area to be intra-coded in the subsequent frame is transitioned to the area 3. Thereafter, the area to be intra-coded is transitioned to the area 4 in the order of address.

As described above, the moving picture coding apparatus 500 according to the fifth embodiment transitions the area to be intra-coded in the screen successively in the order of the arrangement of P pictures arranged in the video signal, as well as when an error arises in the screen, transitions the area to be intra-coded of the subsequent frame to the position where the error arises in the screen. Therefore, the time from the generation of the error to the removal of noises can be reduced.

For example in FIG. 17, when an error arises in the area 1, noises arise in all areas on the right of the area 1, i.e., the areas 1 to 5. Then, the generated noises are not removed until the areas 1 to 5 are intra-coded. When the transition of the area to be intra-coded is always made successively from 1 to 15, the time taken to intra-code the areas 6 to 15 including no noise is required before the areas 1 to 5 are intra-coded. However, when the area to be intra-coded is changed soon after occurrence of an error to the area 1 in which the error occurs, as is the case in the moving picture coding apparatus 500 of the fifth embodiment, the time in which it takes to remove noises is reduced by the time taken to intra-code the areas including no noise.

In this fifth embodiment, not only the MPEG coding method but also other coding methods for dividing a frame into blocks such as H0.261 can be employed.

What is claimed is:

1. A moving picture coding apparatus comprising:
    a coding processing means for coding a video signal in a frame for each block of a prescribed area; and
    a rate control means for controlling the coding processing means so that a generated code amount after coding of the video signal is fixed for each code amount control unit as a unit of the frame or a unit which is smaller than the frame.

2. The moving picture coding apparatus of claim 1, wherein
    when the cumulative amount of generated codes exceeds the upper limit code amount in the code amount control unit which is being coded, the quantization scale calculation means generates an underflow avoidance signal for skipping coding of a block in the code amount control unit by the coding processing means until the cumulative amount of generated codes becomes equal to or less than the upper limit code amount, thereby avoiding underflow, and
    when the cumulative amount of generated codes of the code amount control unit, which has been coded does not react the target generated code amount per the code amount control unit, the quantization scale calculation means subtracts the cumulative amount of generated codes from the target generated code amount per the code amount control unit, thereby calculating a stuffing code amount for a stuffing processing by the coding processing means.

3. The moving picture coding apparatus of claim 1, wherein
    the quantization scale calculation means obtains a tolerance generated code amount as a difference between the upper limit code amount and the target code amount, obtains a generated code amount error as a difference between the cumulative amount of generated codes and the target code amount, and calculates the quantization scale using a quantization scale decision function having inclinations which vary with values of the generated code amount error with respect to the tolerance generated code amount.

4. The moving picture coding apparatus of claim 3, wherein
    the quantization scale decision function has a smaller inclination in the vicinity of 0 of the generated code amount error with respect to the tolerance generated code amount, than in a part where the value of the generated code amount error with respect to the tolerance generated code amount is larger.

5. The moving picture coding apparatus of claim 1, wherein
    the target code amount calculation means obtains a distribution of degree of coding difficulty in each code amount control unit when the coding of the code amount control unit has been finished, and calculates the target code amount of a block which is being coded in a subsequent code amount control unit on the basis of the obtained distribution of degree of coding difficulty.

6. The moving picture coding apparatus of claim 3, wherein the quantization scale decision function has a reference quantization scale as a parameter, and the quantization scale calculation means changes the reference quantization scale for each code amount control unit on the basis of a degree of coding difficulty of each code amount control unit.

7. The moving picture coding apparatus of claim 3, wherein the quantization scale decision function has a reference quantization scale as a parameter, and the quantization scale calculation means changes the reference quantization scale for each code amount control unit on the basis of a quantization scale of each of the code amount control units which have been already coded.

8. The moving picture coding apparatus of claim 3, wherein the quantization scale decision function is made so that the quantization scale varies according to changes in the value of the generated code amount error with respect to the tolerance generated code amount with possessing hysteresis characteristics.

9. A moving picture coding apparatus comprising:

a coding processing means for coding a video signal in a frame for each block of a prescribed area;

a rate control means for controlling the coding processing means so that a generated code amount after coding of the video signal is fixed for each code amount control unit as a unit of the frame or a unit which is smaller than the frame; and a code amount control unit changing means for changing the code amount control unit according to a delay time required for decoding of coded data by a decoding apparatus which decodes the coded data output by the moving picture coding apparatus.

10. The moving picture coding apparatus of claim 1, wherein the upper limit code amount calculation means changes the upper limit code amount according to a delay time required for decoding of coded data by a decoding apparatus which decodes the coded data output by the moving picture coding apparatus.

11. A moving picture coding apparatus comprising:

a coding processing means for coding a video signal in a frame for each block of a prescribed area;

a rate control means for controlling the coding processing means so that a generated code amount after coding of the video signal is fixed for each code amount control unit as a unit of the frame or a unit which is smaller than the frame;

a receiving means for receiving an address of a position of an error which arises in a frame; and an intra area transition means for successively transitioning a position of an area to be intra-coded in each of predictive coding frames arranged in the video signal in the order of arrangement of the predictive coding frames in the video signal, and when an error arises in coded data in the video signal, transitioning a position of an area to be intra-coded of a subsequent predictive coding frame to a position of the error in the predictive coding frame on the basis of the address from the receiving means.

12. A moving picture coding method for coding a video signal for each block of a prescribed area in a frame and controlling an amount of generated codes in a unit of the frame or a unit which is smaller than the frame, the moving picture coding method comprising:

detecting a cumulative amount of generated codes as a cumulative value of amounts of codes generated from a first block to a block which is being coded in a code amount control unit which is being coded;

calculating a target generated code amount per code amount control unit as a target value of an amount of generated codes per code amount control unit;

calculating a target code amount as a target value of accumulation of amounts of codes generated from the first block to the block which is being coded in the code amount control unit on the basis of the target generated code amount per code amount control unit;

calculating an upper limit code amount as an upper limit value of accumulation of amounts of generated codes per code amount control unit on the basis of the target generated code amount per code amount control unit;

calculating a tolerance generated code amount as a difference between the upper limit code amount and the target code amount;

calculating a generated code amount error as a difference between the cumulative amount of generated codes and the target code amount; and obtaining a value of the generated code amount error with respect to the tolerance generated code amount, and calculating a quantization scale of a block which is being coded using a quantization scale decision function whose inclination is changed according to the value of the generated code amount error with respect to the tolerance generated code amount.

13. The moving picture coding method of claim 12, further comprising:

when the cumulative amount of generated codes exceeds the upper limit code amount in a code amount control unit which is being coded, skipping coding of a block in the coding control unit until the cumulative amount of generated codes becomes equal to or smaller than the upper limit code amount; and when the cumulative amount of generated codes of the coding control unit which has been coded does not reach the target generated code amount per code amount control unit, performing stuffing so that the cumulative amount of generated codes reaches the target generated code amount per code amount control unit.

14. The moving picture coding apparatus of claim 5, wherein the quantization scale decision function has a reference quantization scale as a parameter, and the quantization scale calculation means changes the reference quantization scale for each code amount control unit on the basis of the degree of coding difficulty of each code amount control unit.

15. The moving picture coding apparatus of claim 5, wherein the quantization scale decision function has a reference quantization scale as a parameter, and the quantization scale calculation means changes the reference quantization scale for each code amount control unit on the basis of a quantization scale of each of the code amount control units which have already been coded.

16. The moving picture coding apparatus of claim 1, further comprising:

a receiving means for receiving an address of a position of an error which arises in a frame; and an intra area transition means for successively transitioning a position of an area to be intra-coded in each of predictive coding frames arranged in the video signal in the order of arrangement of the predictive coding frames in the video signal, and when an error arises in coded data in the video signal, transitioning a position of an area to be intra-coded of a subsequent predictive coding frame to a position of the error in the predictive coding frame on the basis of the address from the receiving means.

17. The moving picture coding apparatus of claim 2, further comprising:

a receiving means for receiving an address of a position of an error which arises in a frame; and an intra area transition means for successively transitioning a position of an area to be intra-coded in each of predictive coding frames arranged in the video signal in the order of arrangement of the predictive coding frames in the video signal, and when an error arises in coded data in the video signal, transitioning a position of an area to be intra-coded of a subsequent predictive coding frame to a position of the error in the predictive coding frame on the basis of the address from the receiving means.

18. The moving picture coding apparatus of claim 3, further comprising:

a receiving means for receiving an address of a position of an error which arises in a frame; and an intra area transition means for successively transitioning a position of an area to be intra-coded in each of predictive coding frames arranged in the video signal in the order of arrangement of the predictive coding frames in the video signal, and when an error arises in coded data in the video signal, transitioning a position of an area to be intra-coded of a subsequent predictive coding frame to a position of the error in the predictive coding frame on the basis of the address from the receiving means.

19. The moving picture coding apparatus of claim 4, further comprising:

a receiving means for receiving an address of a position of an error which arises in a frame; and an intra area transition means for successively transitioning a position of an area to be intra-coded in each of predictive coding frames arranged in the video signal in the order of arrangement of the predictive coding frames in the video signal, and when an error arises in coded data in the video signal, transitioning a position of an area to be intra-coded of a subsequent predictive coding frame to a position of the error in the predictive coding frame on the basis of the address from the receiving means.

20. The moving picture coding apparatus of claim 5, further comprising:

a receiving means for receiving an address of a position of an error which arises in a frame; and an intra area transition means for successively transitioning a position of an area to be intra-coded in each of predictive coding frames arranged in the video signal in the order of arrangement of the predictive coding frames in the video signal, and when an error arises in coded data in the video signal, transitioning a position of an area to be intra-coded of a subsequent predictive coding frame to a position of the error in the predictive coding frame on the basis of the address from the receiving means.

21. The moving picture coding apparatus of claim 6, further comprising:

a receiving means for receiving an address of a position of an error which arises in a frame; and an intra area transition means for successively transitioning a position of an area to be intra-coded in each of predictive coding frames arranged in the video signal in the order of arrangement of the predictive coding frames in the video signal, and when an error arises in coded data in the video signal, transitioning a position of an area to be intra-coded of a subsequent predictive coding frame to a position of the error in the predictive coding frame on the basis of the address from the receiving means.

22. The moving picture coding apparatus of claim 14, further comprising:

a receiving means for receiving an address of a position of an error which arises in a frame; and an intra area transition means for successively transitioning a position of an area to be intra-coded in each of predictive coding frames arranged in the video signal in the order of arrangement of the predictive coding frames in the video signal, and when an error arises in coded data in the video signal, transitioning a position of an area to be intra-coded of a subsequent predictive coding frame to a position of the error in the predictive coding frame on the basis of the address from the receiving means.

23. The moving picture coding apparatus of claim 7, further comprising:

a receiving means for receiving an address of a position of an error which arises in a frame; and an intra area transition means for successively transitioning a position of an area to be intra-coded in each of predictive coding frames arranged in the video signal in the order of arrangement of the predictive coding frames in the video signal, and when an error arises in coded data in the video signal, transitioning a position of an area to be intra-coded of a subsequent predictive coding frame to a position of the error in the predictive coding frame on the basis of the address from the receiving means.

24. The moving picture coding apparatus of claim 15, further comprising:

a receiving means for receiving an address of a position of an error which arises in a frame; and an intra area transition means for successively transitioning a position of an area to be intra-coded in each of predictive coding frames arranged in the video signal in the order of arrangement of the predictive coding frames in the video signal, and when an error arises in coded data in the video signal, transitioning a position of an area to be intra-coded of a subsequent predictive coding frame to a position of the error in the predictive coding frame on the basis of the address from the receiving means.

25. The moving picture coding apparatus of claim 8, further comprising:

a receiving means for receiving an address of a position of an error which arises in a frame; and an intra area transition means for successively transitioning a position of an area to be intra-coded in each of predictive coding frames arranged in the video signal in the order of arrangement of the predictive coding frames in the video signal, and when an error arises in coded data in the video signal, transitioning a position of an area to be intra-coded of a subsequent predictive coding frame to a position of the error in the predictive coding frame on the basis of the address from the receiving means.

26. The moving picture coding apparatus of claim 9, further comprising:

a receiving means for receiving an address of a position of an error which arises in a frame; and an intra area transition means for successively transitioning a position of an area to be intra-coded in each of predictive coding frames arranged in the video signal in the order of arrangement of the predictive coding frames in the video signal, and when an error arises in coded data in the video signal, transitioning a position of an area to be intra-coded of a subsequent predictive coding frame to a position of the error in the predictive coding frame on the basis of the address from the receiving means.

27. The moving picture coding apparatus of claim 10, further comprising:

a receiving means for receiving an address of a position of an error which arises in a frame; and an intra area transition means for successively transitioning a position of an area to be intra-coded in each of predictive coding frames arranged in the video signal in the order of arrangement of the predictive coding frames in the video signal, and when an error arises in coded data in the video signal, transitioning a position of an area to be intra-coded of a subsequent predictive coding frame to a position of the error in the predictive coding frame on the basis of the address from the receiving means.

* * * * *

UNITED STATES PATENT AND TRADEMARK OFFICE
CERTIFICATE OF CORRECTION

PATENT NO.    : 6,408,027 B2
DATED         : June 18, 2002
INVENTOR(S)   : Toshiaki Mori et al.

It is certified that error appears in the above-identified patent and that said Letters Patent is hereby corrected as shown below:

<u>Column 26,</u>
Line 22, before the period (.), please insert:
--,
wherein the rate control means comprises:
   a generated code amount detection means for detecting a cumulative amount of generated codes as a cumulative valve of amounts of codes generated from a first block to a block which is being coded in a code amount control unit which is being coded;
   a target code amount calculation means for setting a target generated code amount per code amount control unit as a target value of accumulation of amounts of codes which are generated from a first block to a last block in the code amount control unit, and calculating a target code amount as a target value of accumulation of amounts of codes which are generated from the first block to a block which is being coded in the code amount control unit;
   an upper limit code amount calculation means for calculating an upper limit code amount as an upper limit value of accumulation of generated code amounts per code amount control unit; and
   a quantization scale calculation means for calculating a quantization scale of the block which is being coded, on the basis of the cumulative amount of generated codes calculated by the generated code amount detection means, the target code amount calculated by the target code amount calculation means, and the upper limit code amount calculated by the upper limit code amount calculation means --
Line 36, delete ",".

Signed and Sealed this

Seventeenth Day of December, 2002

JAMES E. ROGAN
*Director of the United States Patent and Trademark Office*